United States Patent [19]
Abu-Amara et al.

[11] Patent Number: 6,026,092
[45] Date of Patent: *Feb. 15, 2000

[54] HIGH PERFORMANCE FAULT TOLERANT SWITCHING SYSTEM FOR MULTIMEDIA SATELLITE AND TERRESTRIAL COMMUNICATIONS NETWORKS

[75] Inventors: Hosame Hassan Abu-Amara, Richardson; Venkat Kotamarti, Dallas, both of Tex.

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,755

[22] Filed: Dec. 31, 1996

[51] Int. Cl.⁷ ...................................................... H04J 3/26
[52] U.S. Cl. ......................... 370/411; 370/395; 370/424; 370/388
[58] Field of Search ................................... 370/411, 414, 370/424, 386, 387, 388, 395

[56] References Cited

U.S. PATENT DOCUMENTS

| | | | |
|---|---|---|---|
| 4,866,701 | 9/1989 | Giacopelli et al. ...................... | 370/411 |
| 4,891,803 | 1/1990 | Huang et al. ............................ | 370/411 |
| 5,287,346 | 2/1994 | Bianchini, Jr. et al. ................ | 370/411 |
| 5,305,310 | 4/1994 | Itoh et al. ............................... | 370/411 |
| 5,327,420 | 7/1994 | Lyles ...................................... | 370/411 |

OTHER PUBLICATIONS

S.M. Shen et al., "DbDest: An Efficient, High–Performance, Fault–Tolerant Fabric for Broadband ISDN," IEEE 1995, pp. 1142–1146.

J. Hickey et al., "The Architecture of the Sunshine Broadband Testbed," ISS, Oct. 1992, vol. 1, pp. 203–208.

S.W. Seo et al., "Modified Composite Banyan Network With an Enhanced Terminal Reliability," Computer Communications, vol. 17, No. 10, Oct. 1994, pp. 750–757.

A. Baicchi et al., "Modelling and Dimensioning of an Integrated Circuit and Packet Switching Scheme On–Board a Processing Satellite," IEEE 1996, pp. 936–941.

J. Huang et al., "Broadband Satcom System for Mutlimedia Services," IEEE 1996, pp. 906–910.

Ahmadi, et al, A Survey of Modern High–Performance Switching Techniques, IEEE Journal on Selected Areas in Communications, vol. 7, No. 7, Sep. 1989, pp. 1091–1103.

Arthurs, et al, HYPASS: An Optoelectronic Hybrid Packet Switching System, IEEE Journal on Selected Areas in Communications, vol. 6, No. 9, Dec. 1988, pp. 1500–1510.

Chao, A Novel Architecture for Queue Management in the ATM Network, IEEE Journal on Selected Areas in Communications, vol. 9, No. 7, Sep. 1991, pp. 1110–1118.

Chen, et al, High–Throughput Cell Scheduling for Broadband Switching Systems, IEEE Journal on Selected Areas in Communications, vol. 9, No. 9, Dec. 1991, pp. 1510–1523.

Devault, et al, The "Prelude" ATD Experiment: Assessments and Future Prospects, IEEE Journal on Selected Areas in Communications, vol. 6, No. 9, Dec. 1988, pp. 1528–1537.

Eng, A Photonic Knockout Switch for High–Speed Packet Networks, IEEE Journal on Selected Areas in Communications, vol. 6, No. 7, Aug. 1988, pp. 1107–1116.

(List continued on next page.)

*Primary Examiner*—Chi H. Pham
*Assistant Examiner*—Frank Duong
*Attorney, Agent, or Firm*—Kenneth W. Bolvin; Andrew J. Dillon

[57] ABSTRACT

A switch that has a plurality of inputs in which cells are received at these inputs. Each cell received at the inputs of the switch contain routing information. A routing means is employed to route the cells received at the inputs of the switch to outputs using routing information in which a number of the cells are misrouted by the routing means during the process of routing the cells to the outputs. Bus means is employed to route a cell to the destination in which the bus means is connected to the routing means. The bus means routes misrouted cells that are misrouted from the destination by some selected amount.

29 Claims, 25 Drawing Sheets

OTHER PUBLICATIONS

Giacopelli, et al, Sunshine: A High–Performance Self-t–Routing Broadband Packet Switch Architecture, IEEE Journal on Selected Areas in Communications, vol. 9, No. 8, Oct. 1991, pp. 1289–1298.

Hluchyj, et al., Queueing in High–Performance Packet Switching, IEEE Journal on Selected Areas in Communications, vol. 6, No. 9, Dec. 1988, pp. 1587–1597.

Hui, Switching Integrated Broadband Services by Sort–Banyan Networks, Preceedings of the IEEE, vol. 79, No. 2, Feb. 1991, pp. 145–154.

Karol, et al., Input Versus Output Queueing on a Space–Division Packet Switch, IEEE Transactions on Communications, vol. COM–35, No. 12, Dec. 1987, pp. 1347–1356.

Lee, A Modular Architecture for Very Large Packet Switches, IEEE Transactions on Communications, vol. 38, No. 7, Jul. 1990, pp. 1097–1106.

Narasimha, A Recursive Concentrator Structure with Applications to Self–Routing Switching Networks, IEEE Transactions on Communications, vol. 42, No. 2/3/4, Feb./Mar./Apr. 1994, pp. 896–898.

Suzuki, et al, Very High–Speed and High–Capacity Packet Switching for Broadband ISDN, IEEE Journal on Selected Areas in Communications, vol. 6, No. 9, Dec. 1988, pp. 1556–1564.

Fig. 16

HIGH PERFORMANCE FAULT TOLERANT SWITCHING SYSTEM FOR MULTIMEDIA SATELLITE AND TERRESTRIAL COMMUNICATIONS NETWORKS

BACKGROUND OF THE INVENTION

1. Technical Field

The present invention relates generally to a communications system and in particular to a method and apparatus for routing data within the communications system. Still more particularly, the present invention relates to a switching system employed for routing cells from a source to a destination in a communications system.

2. Description of the Related Art

Factors driving the need for broadband communications arise from changing user needs and demands. Previously, public network needs were driven by telephoning, voice data. Data traffic has grown slowly until recently. With the lower cost in telecommunications and the higher increase in processing power of computers, the numbers of users accessing communications networks has increased. The needs of these users include, for example, video telephone, low cost video conferencing, imaging, high definition television (HDTV), and other applications requiring multimedia data transfers. Multimedia combines different forms of media in the communication of information between a user and a data processing system, such as a personal computer. A multimedia application is an application that uses different forms of communications within a single application. Multimedia applications may, for example, communicate data to a user on a computer via audio, text, and video simultaneously. Such multimedia applications are usually bit intensive, real time, and very demanding on communications networks. A number of definitions have been given for broadband service. One example is the International Telecommunications Union (ITU, formerly known as CCITT), which defines broadband service as a service requiring transmission channels capable of supporting rates greater than 1.5 Mbps or a primary rate in ISDN or T1 or DS1 in digital terminology. A broadband integrated services digital network (BISDN) technology framework involves asynchronous transfer mode (ATM) as a protocol for coordinating information flow at a source and destination node. For terrestrial networks, synchronous optical network (SONET), a standard for fiber optical transmission mediums form the backbone technology for BISDN. More information on broadband communications can be found in Kurnar, *Broadband Communications: A Professional's Guide to (ATM) Frame Relay, SMDS, SONET, and BISDN*, McGraw-Hill, Inc., New York, (1995).

The progress in fiber optic and network technologies have made BISDN a commercial reality and has made possible sophisticated computer applications, such as the transmission of video, voice, and other data over computer networks. ATM is the most common switching technique used by broadband networks to integrate a variety of multirate services, ranging from high speed video services and computer communications to low speed voice services, into a single high speed network. Currently, the ATM standard defined by ITU specifies fixed packet sizes (cells) consisting of 5 bytes in a control field and 48 bytes in a data field and supports line speeds of up to 150 Mbps, 600 Mbps, or above. ATM networks are packet-oriented, in which information is packetized, carried in fixed length packets, and transmitted in a slot by slot fashion. Most integrated services provided by BISDN falls into two major categories. In the first category, circuit emulation type, also called connection oriented, requires reserving the bandwidth for the whole duration of the connection because extremely low cell loss rates, such as less than 1e-11, is crucial. In the second category, the connectionless type, the bandwidth requirement is unpredictable and bursty, such as in intercomputer data communication, but a certain degree of cell loss is tolerable, such as less than 1e-6. In networks that provide both types of services, it is very common and desirable to assign higher priority to the cells of connection-oriented services than to the cells of connectionless services.

To meet high speed transmission demands, ATM employs a hardware-based fast packet switching technique that allows cells to be self-routed from input ports through an interconnection network to output ports by using the destination address information stored in cell headers. Carrying large amounts of information over long distances with the help of high bandwidth satellites or fiber optics is straight forward, but the switching of high-speed packet flows is a challenging task.

The design of BISDN and ATM switches is made more difficult by the requirement that customer expectations be met and the network be used efficiently.

One way to satisfy customer expectations is for the switches to ensure that the quality of service (QoS) parameter values for the multimedia services are not exceeded. A further complication of switch design is that the switches are required to have a high degree of fault-tolerance. Modern satellite systems, such as Teledesic and Advanced Satcom, have ATM switches on board the satellites. ATM networks and these types of satellites carry a large volume of integrated multimedia traffic. As a result, a failure in the switches can be catastrophic for a large number of users. Additionally, networks including satellite switches impose other complications on switch design. If the ATM switch is to be implemented on board a satellite, then the ATM switch must be as small as possible and must be implemented in technologies that consume as little power as possible.

Several switch architecture designs exist for BISDN and ATM networks. These architectures can be classified into three categories: (1) wavelength switching architectures; (2) time switching architectures; and (3) space switching architectures. More information about digital switching architectures can be found in G. Fantauzzi, *Digital Switching Control Architectures*, Artech House Inc., Norwood, Mass., 1990. The wavelength switching architecture, like the photonic knockout switch, and the HYPASS use wavelength division multiplexing techniques to switch packets. More information on the photonic knockout switch and the HYPASS switch may be found in K. Y. Eng, *A Photonic Knockout Switch for High-Speed Packet Networks*, IEEE J. Select. Areas Cominun., Vol. 6, pp. 1107–1116, August 1988, and E. Arthurs, M. S. Goodman, H. Kobrinski, and M. P. Veechi, *HYPASS: An Optoelectronic Hybrid Packet Switching System*, IEEE J. Select. Areas Commun., Vol. 6, pp. 1500–1510, December 1988, respectively. The drawback of these designs is the requirement of a wide-range agile tunable laser and slot synchronization, which prevent the switch from high speed operation. For time switching architectures, components are shared, thus restricting the overall system throughput. For example, the PARIS switch relies on a shared high speed bus, the Prelude switch is based on a shared memory, and the HPS switch requires multiple shared rings. More information on these switches may be found in H. Ahmadi, and W. E. Denzel, *A Survey of Modern High-Performance Switching Techniques*, IEEE Select. Areas Commun, Vol. 7, pp. 1091–1103, September 1989; M.

Devault, J. Y. Cochennec, and M. Servel, *The Prelude A TD Experiment: Assignments and Future Prospects*, IEEE J. Select. Areas Commun, Vol. 6, pp. 1528–1537, December 1988; H. Suzuki, T. Takeuchi, F. Akashi, and T. Yamaguchi, *Very High-Speed and High-Capacity Packet Switching for Broadband ISDN*, IEEE J. Select. Areas Commun., Vol. 6, pp. 1556–1564, December 1988, respectively. Space switching has the merit of allowing high speed operation and is most appropriate for BISDN and ATM networks. According to hardware complexity, space switching can be subdivided into three categories: (1) $N^2$ disjoint path switching; (2) crossbar switching; and (3) banyan-based switching. Compared with $N^2$ disjoint path switching and crossbar switching, banyan-based switching requires a small number of switch elements, and has a consistent path link and transit time for input and output pairs. Additionally, the switch elements operate without knowing the full address of the output ports. Thus, banyan-based switches are the most economical and efficient for BISDN and ATM networks.

Previous banyan-based switches, such as the existing SunShine switch architecture, require a large amount of hardware, have a large end-to-end delay, do not tolerate faults, or require expensive implementation technology. More information on SunShine switch architecture may be found in J. N. Giacopelli, J. J. Hickey, W. S. Marcus, and W. D. Sincoskie, *SunShine: A High-Performance Self-Routing Broadband Packet Switch Architecture*, IEEE J. Select. Areas Commun., Vol. 9, pp. 1289–1298, October 1991.

Therefore, it would advantageous to have an improved switching system that reduces the amount of hardware required, reduces the end-to-end delay, tolerates faults, or employs inexpensive technology. Additionally, it would be advantageous to have an improved switching system that consumes less power and is scalable to handle varying amounts of total traffic.

SUMMARY OF THE INVENTION

The present invention provides a switch that has a plurality of inputs in which cells are received at these inputs. Each cell received at the inputs of the switch contain routing information. A routing means is employed to route the cells received at the inputs of the switch to outputs using routing information in which a number of the cells are misrouted by the routing means during the process of routing the cells to the outputs. A bus means is employed to route a cell to the destination in which the bus means is connected to the routing means. The bus means routes misrouted cells that are misrouted from the destination by some selected amount.

In accordance with a preferred embodiment of the present invention, the switch contains input port controllers for receiving cells and attaching a header to the cells that contains routing information including a destination associated with an output for the switch. A batcher sorting network sorts the cells using the routing information within the header and an output contest network receives the sorted cells and resolves contention for similar destinations in which too many cells are being routed to the same destination. A portion of the first number of cells are marked for routing to the destination by the output contest network. The concentrator network sorts out cells that are not to be routed to the same destination and sends the portion of the cells marked for routing to the destination to a number of switching networks in which each switching network includes a single path switching matrix and a dual bus. This routing mechanism allows for double destination switching in which cells misrouted within the switching networks are sent to the dual bus for routing to the correct output in response to the cell being misrouted to an output adjacent to the correct output for the cell. The cells are sent out of the switch through output port controllers.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 16 depicts a diagram illustrating steps in a multilink access algorithm according to the present invention;

DETAILED DESCRIPTION

I. Environment

Figure 1:
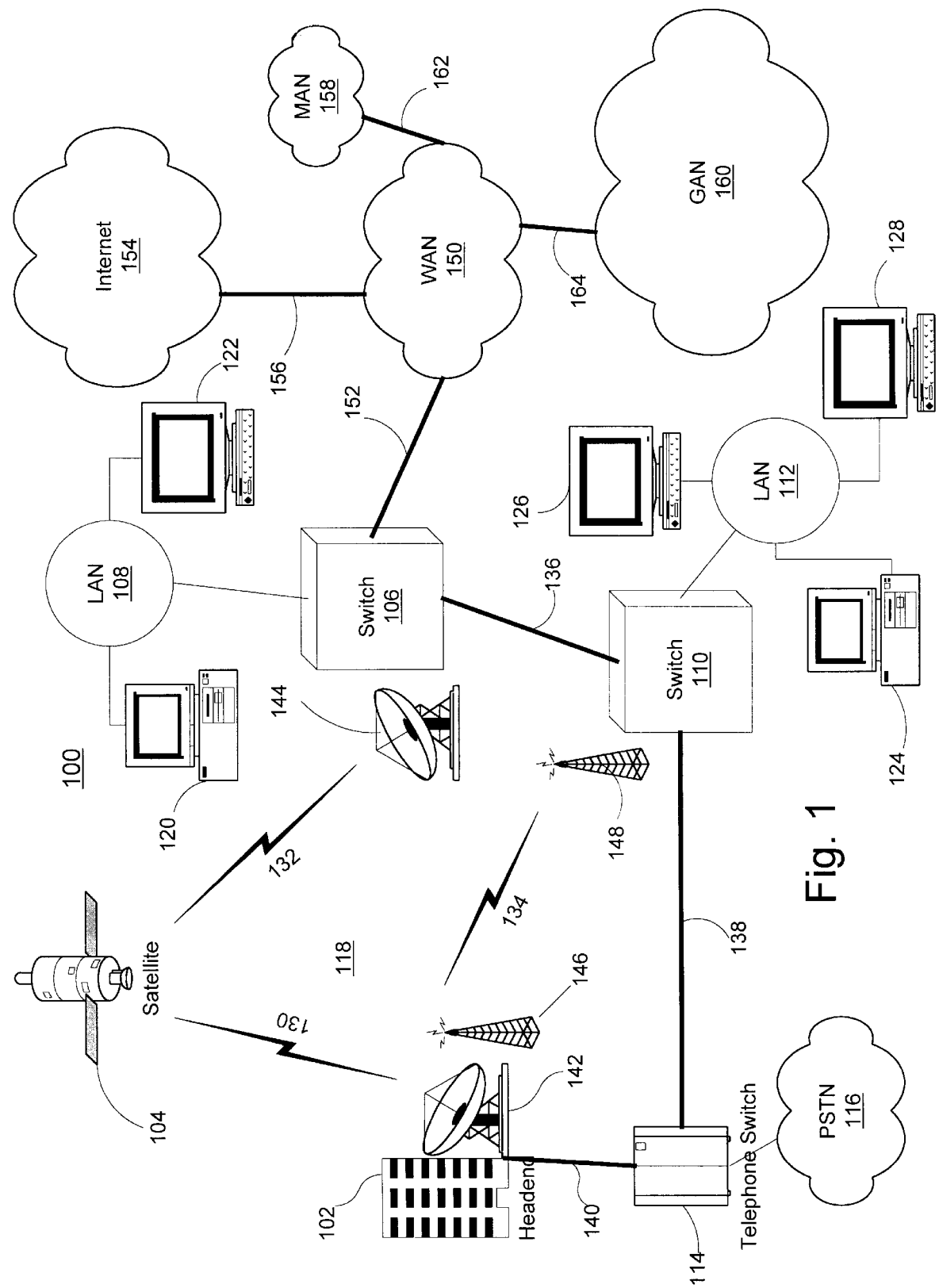
FIG. 1 depicts a diagram of a communications system according to the present invention.

With reference now to the figures, and in particular with reference to FIG. 1, a diagram of a communications system 100 is depicted according to the present invention. In particular, the present invention may be implemented in the various switches depicted in communication system 100. Headend 102; satellite switch 104; switch 106, which is a terrestrial switch, connected to local area network (LAN) 108; switch 110 connected to LAN 112; and telephone switch 114 connected to public switch telephone network (PSTN) 116 form a wide area network (WAN) 118. LAN 108 includes computers, such as computers 120 and 122. LAN 112 also includes computers 124, 126, and 128. Users of these computers may send information to and from each other or to other users (not shown) within WAN 118 via communications links 130, 132, 134, 136, 138, and 140. Communications link 130 is a radio frequency based link in which the data signal is transmitted from satellite dish 142 at headend 102 to satellite switch 104. Communications link 132 is a radio frequency based link, generated by signals sent from satellite switch 104 to satellite dish 144, which is associated with switch 106. In this manner, data signals, such as multimedia data, which may include video, graphics, voice, and text, may be sent from headend 102 to a computer such as computer 120 in LAN 108. Satellite dish 144 may transmit data signals through communications link 132 to satellite switch 104 and through communications link 130 to satellite dish 142 for reception at headend 102. Communications link 134 is a radio frequency communications link generated between radio tower 146, associated with headend 102 and radio tower 148, associated with switch 110. Switch 106, switch 110, telephone switch 114, and headend 102 are connected to each other via communications links 136, 138, and 140, which are physical links, such as, for example, coaxial cable, fiber optic cable, or a combination of the two. Each switch has a "link", also called a "path" within the switch for routing data through the switch. An "input link" is the input or source portion of the link associated with an input into the switch, and an "output link" is the output or destination portion of the link associated with an output from the switch.

Data may be sent through a number of different paths using various communications links and switching within WAN 118. For example, a user at computer 124 may send information to a user in public switched telephone network (PSTN) 116 through communications link 138. Alternatively, information may reach the user in PSTN 116 from computer 124 by sending data through a path starting with communications link 136 to communications link 132, to communications link 130, and then to communications link 140 to reach the user within PSTN 116. The various switches in WAN 118 direct traffic between other switches to facilitate flow of information within this network. Although the depicted examples show data transfers between computers, data also may be transferred between other communication devices (not shown) within communication system 100.

WAN 118 is connected to other networks, such as WAN 150 through a communications link 152 connected to switch 106. A WAN is typically designed to interconnect computer systems over large geographic scopes, such as from one city to another city within a country. Typically, a WAN may range from 100 KM to 1000 KM and the speed between the cities can range from 1.5 Mpbs to 2.4 Gpbs. Communications system 100 also includes a connection from WAN 150 to internet 154 through communications link 156. Additionally, other types of networks such as metropolitan area network (MAN) 158 and global area network (GAN) 160 through communications links 162 and 164, respectively. Metropolitan area networks typically cover a metropolitan city and interconnects a number of different LANs located in different buildings. A global area network provides connections between countries around the globe. An example of such a network is internet 154. Data is transferred to and from these various networks and to communication systems and devices within the networks using switches, such as those depicted for WAN 118. The switching system of the present invention is implemented in a satellite switch, such as satellite switch 104 according to a preferred embodiment of the present invention. The present invention also may be implemented in switches other than satellite switches.

II. General Double Destination (DbDest) Switch Architecture

Figure 2:
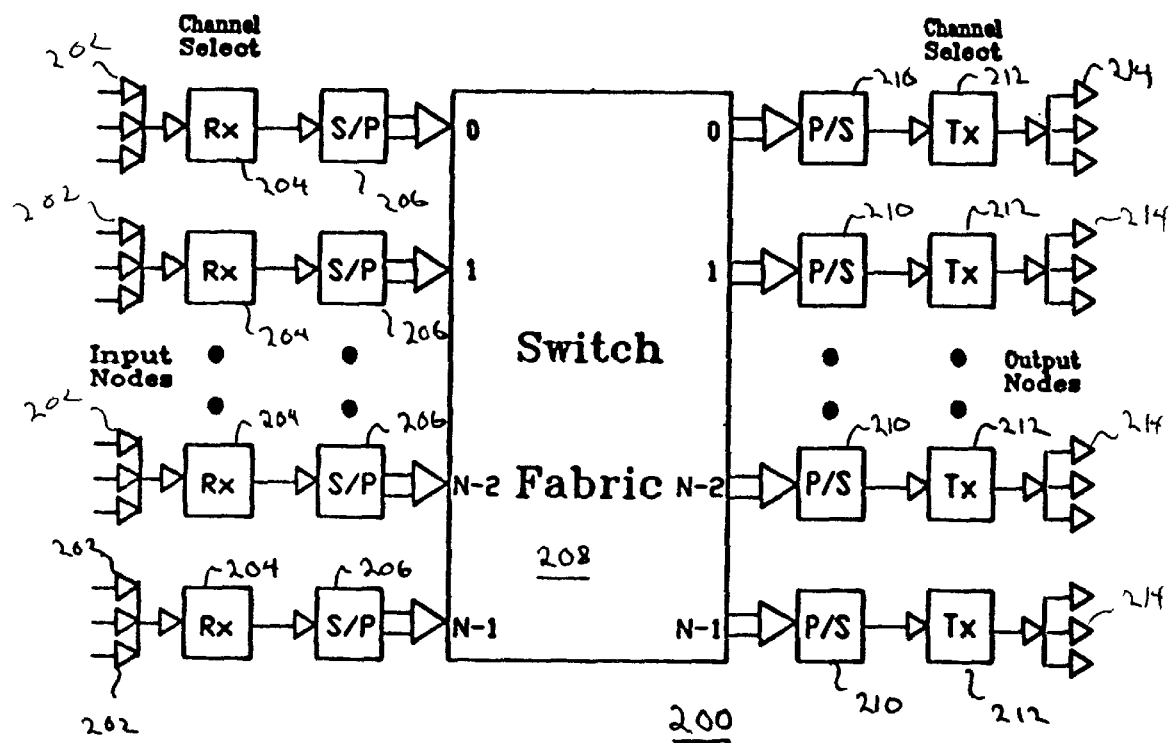
FIG. 2 is a block diagram of a switch according to the present invention.

Turning now to FIG. 2, a block diagram of a switch 200 is depicted according to the present invention. Switch 200 may be implemented within communications system 100 in various switches. In accordance with a preferred embodiment of the present invention, switch 200 is particularly suited for implementation in satellite switch 104 although switch 200 may be employed in other switches located on the ground in communications system 100.

Switch 200 is a double destination switch, also called DbDest. This switch implements an improved space-division fast packet switch architecture. In switch 200, cells misrouted by one output destination may still be correctly routed to the appropriate output associated with the destination for the cell through the two one-hop buses.

In the depicted example, data in the form of ATM cells is received at input nodes 202, in which each input node 202 represents a "channel". Receivers (Rxs) 204 receive ATM cells from a number of these channels. Each receiver (Rx) 204 sends ATM cells to art associated serial to parallel (S/P) converter 206 with the ATM cells being sent to switch fabric 208 in a parallel form. The output of each S/P converter 206 consists of B parallel lines where B is a design parameter chosen by implementers of the switch. In what follows, a bus unit is defined to be a group of B parallel lines. In each system clock cycle, a bus unit carries B bits of an ATM cell. Switch fabric 208 includes N inputs for S/P converters 206. The ATM cells are routed and sent to parallel to serial (P/S) converters 210, which convert the parallel data representing the ATM cells into serial form for transmission by transmitters (Txs) 212 to output nodes 214. Transmitters 212 select the appropriate node 214 to transmit the ATM cells.

Figure 4:
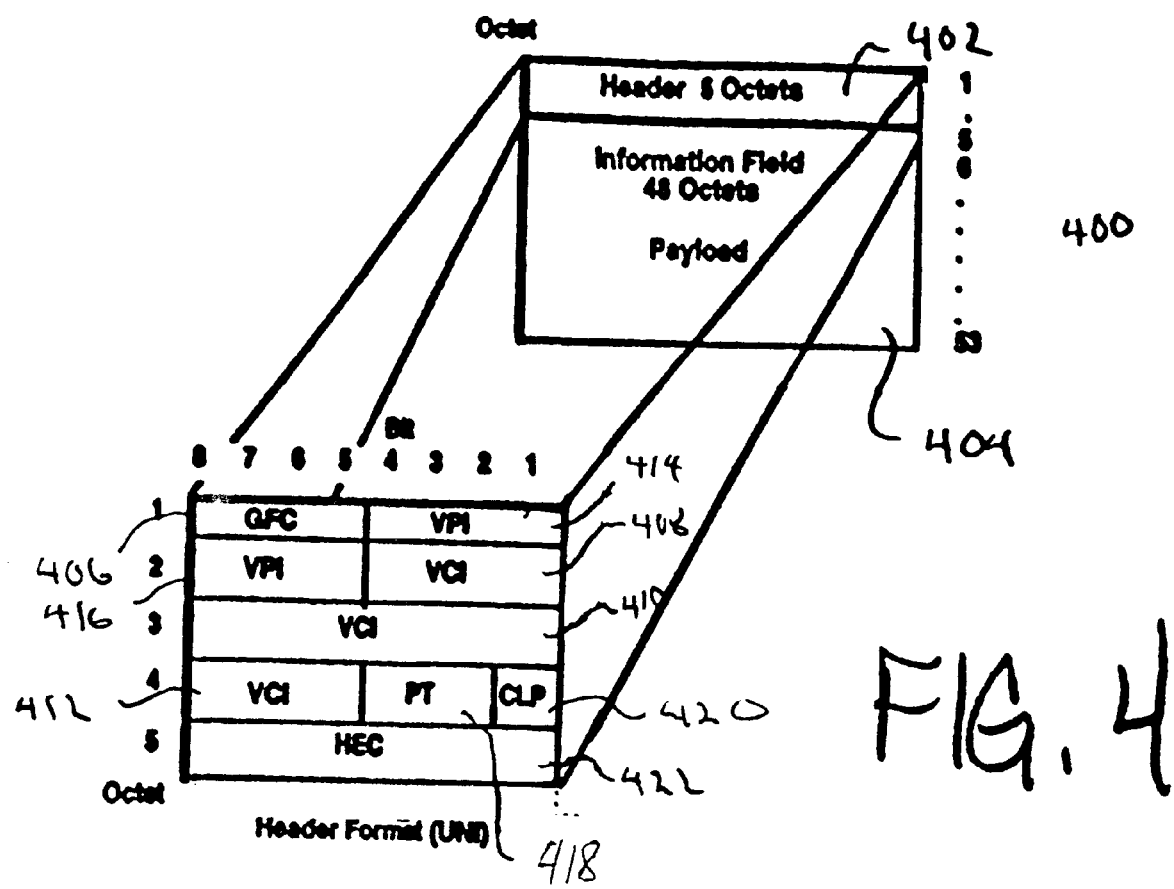
FIG. 4 is a diagram of an ATM cell that may be routed through switch fabric 208 according to the present invention.

A diagram of an ATM cell that may be routed through switch fabric 208 is illustrated in FIG. 4 in accordance with a preferred embodiment of the present invention. ATM cell 400 is a 53 byte packet having a header 402 and a payload 404 in which header 402 is a 5 byte header and payload 404 is a 48 byte payload. Header 402 includes a generic flow control (GFC) field 406, which provides contention resolution and simple flow control for shared medium-access arrangements and is present in cells located between a user and a network. ATM cells located between different switches do not contain this field. Virtual channel identifier (VCI) fields 408, 410, and 412 are employed to establish connections using translation tables at switching nodes that map an incoming VCI to an outgoing VCI. The VCI field in the header of an ATM cell is typically 16 bits. Virtual path identifier (VPI) fields 414 and 416 are used to establish a virtual path connection for one or more logically equivalent VCIs in terms of route and service characteristics. VPI fields 414 and 416 are either 8 or 12 bits depending on the location of the ATM cell.

ATM cells between switches have 12 bits for VPI while ATM cells traveling from a user to a network or switch have 8 bits. Payload type (PT) field 418 is a 3 bit field employed to differentiate cells traversing the same virtual circuit and can contain various operation, administration, and maintenance information or user information. Cell loss priority (CLP) field 420 is a 1 bit field employed to explicitly indicate cells of lower priority by setting the field to a "1". Header error control (HEC) field 422 is used to perform a cyclic redundancy check (CRC) calculation on the first 4 bytes of the header field for error detection and correction. More information on ATM cells and switching systems can be found in Geralski, *Introduction to ATM Networking*, McGraw-Hill, Inc., (1995), ISBN 0-07-024043-4.

In the depicted example, switch 200 employs high-speed gallium arsenic (GAS) technology for external serial connections, such as the lines into serial to parallel converters 206 and the lines out of parallel to serial converters 210. Switch fabric 208 may be implemented in an integrated circuit. Low-speed complimentary-metal-oxide-semiconductor (CMOS) technology is used for internal parallel lines inside the chip. As a result, external serial connections do not become a bottleneck and a large scale switch fabric can accomplish very high speeds.

Figure 3:
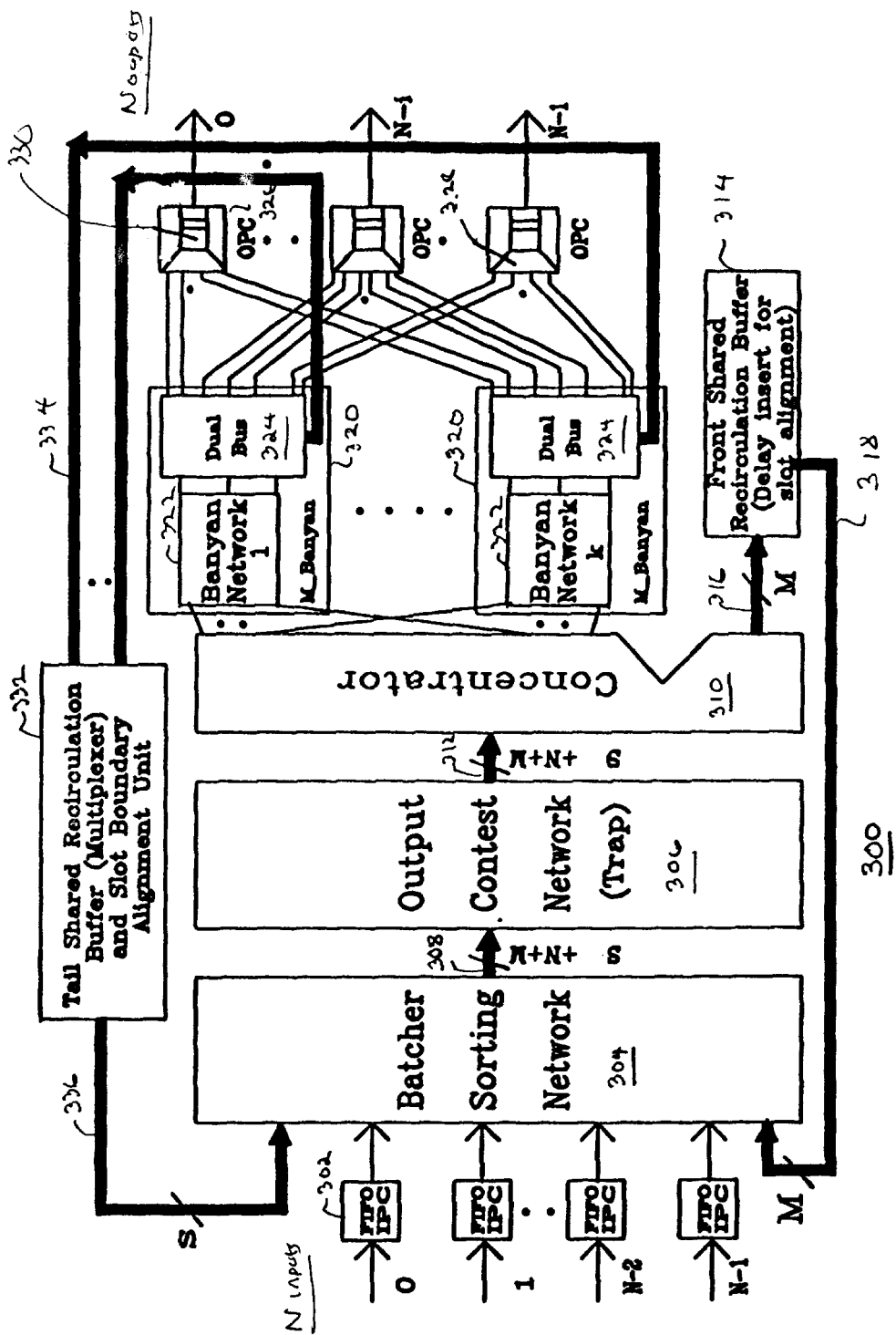
FIG. 3 depicts a block diagram of a switch fabric from FIG. 2 is depicted according to the present invention.

With reference now to FIG. 3, a block diagram of a switch unit 300 found in switch fabric 208 from FIG. 2 is depicted according to the present invention. Switch unit 300 may be implemented in an integrated circuit. One or more switch units, such as switch unit 300, may be employed within switch fabric 208. ATM cells from serial to parallel converters 206 in FIG. 2 are received by input port controllers (IPCs) 302.

Figure 5:
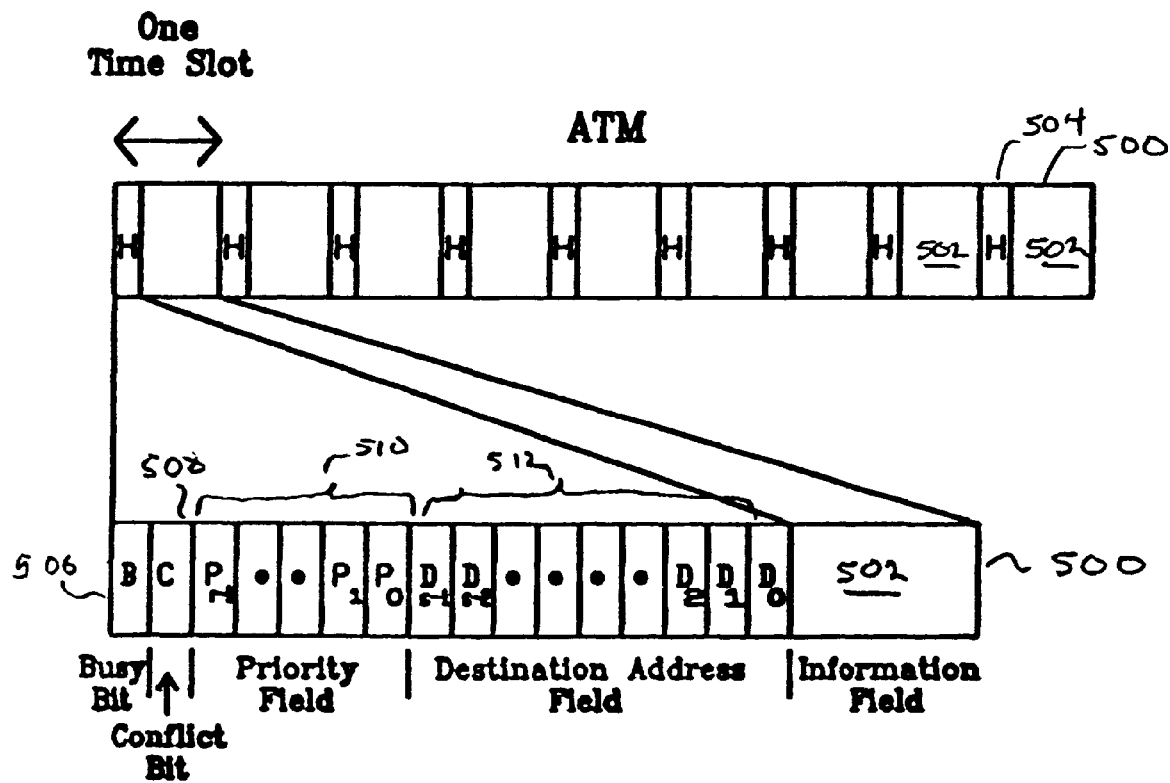
FIG. 5 is a diagram of cells routed within the switch fabric according to the present invention.

Referring back to FIG. 3, IPCs 302 are FIFO based IPCs, which contain FIFO queues (not shown). IPCs 302 add headers to incoming ATM cells to form cells for routing within switch fabric 208. When ATM cells arrive at IPCs 302, the ATM cells are bit synchronized with the internal clock system of switch fabric 208 and aligned with the local slot boundary. Next, the ATM cell headers are analyzed and a local switch header is generated and attached to each ATM cell as a prefix to form cells 500 as illustrated in FIG. 5. Basically, cells 500 within switch fabric 208 have an information field 502 which consists of the incoming ATM cell.

In FIG. 5, cells 500 each contain an ATM cell, such as ATM cell 400, as illustrated in FIG. 4 in information field 502. Headers 504 are added to incoming ATM cells by input port controllers 302 in FIG. 3. Each header 504 contains a number of fields for control information. Busy bit field 506 is the first field in header 504 and consists of 1 bit. Busy bit field 506 indicates whether a cell exists in information field 502. Variable B in busy bit field 506 is set equal to a "1" if a cell exists and is set equal to a "0" if no cell exists in information field 502. The second field is a conflict bit field 508, which is a 1 bit field that indicates if the cell has been misrouted or properly routed. In the depicted example, the variable C in conflict bit field 508 is set equal to a "1" if the cell has been misrouted and is set equal to a "0" if the cell has been properly routed in the depicted example. The third field is a priority field 510, which consists of $\log_2 \overline{M}$ priority bits where $\overline{M}$ is the number of priority levels. (i.e., p=<$P\log_2 \overline{M}$-1, . . . P0.>) The priority of a cell is determined at the initial call set up and remains unchanged for the lifetime of the cell within switch fabric 208. In the depicted example, priority field 510 includes bits $P_0$ through $P_{r-1}$ where r is the number of priority bits. The next field is a destination address field 512, which consists of $\log_2 N$ bits where N is the network size (i.e., number of outputs of the switch) (i.e., D=<$D\log_2 N$-1, . . . , DO>) to indicate the address of the output port to which the cell is destined. This address typically comes directly from the virtual circuit information in the original ATM header of the ATM cell located in information field 502. These cells 500 are routed within switch fabric 208.

From IPCs 302, cells are sent to batcher sorting network 304, where cells are sorted in order of destination address and of priority if a priority service is indicated for a cell. More information on batcher sorting networks may be found in J. Hui, *Switching Integrated Broadband Services by Sort-Banyan Networks*, Proc. IEEE, Vol. 79, pp. 145–154, February 1991, and K. Hwang, and F. A. Briggs, *Computer Architecture and Parallel Processing*, McGraw-Hill, Inc., New York, (1984), respectively. After being sorted according to their output, cells are then sent to the next stage, output contest network 306, which is also called a "trap network". Bus 308 has a width of N'=S+N+M bus units. N is the number of FIFO IPCs. This number is chosen by the switch designer to satisfy the provisioning of telecommunication traffic. The amount of hardware, and therefore cost, of the switch is proportional to N. M is the number of loser cells (see below) that the concentrator allows to re-circulate in an ATM cell time slot. S is the number of cells that the M_banyan networks (see below) allow to re-circulate in an ATM cell time slot. Both M and S are design parameters that the switch designer chooses to meet ATM quality of service requirements. The larger the values of M and S, the better the quality of service, and the larger the size of the switch.

Output contest network 306 is employed to resolve output port contentions. Concentrator network 310 separates cells to be routed ("winner" cells) from the cells to be recirculated or discarded ("loser" cells). Concentrator 310 is connected to output contest network 306 by bus 312, which has a width of N' where N'=S+N+M. Switch unit 300 also includes a front shared recirculation buffer 314 that is connected to concentrator 310 by bus 316, which has M bus units. Bus 318 connects front shared recirculation buffer 314 back to batcher sorting network 304 and also has a width of M bus units. Switch fabric 300 contains k networks 320 arranged in a parallel fashion. Each network 320 is a modified banyan network, also referred to as a "M_banyan network", which includes a banyan network 322, also called a "self-routing network" or a single path switching matrix. Basically, banyan networks 322 are single-path switching matrixes in which only one path exists to reach the destination from a given input.

The output of each banyan network 322 is connected to a dual bus 324, which includes two single-hop buses in accordance with a preferred embodiment of the present invention. The output from dual bus 324 leads to output port controllers (OPCs) 326. Each output port controller 326 includes a multiplexer 328 and a queue 330 which lead to N outputs. Additionally, each dual bus 324 has a connection to tail shared recirculation buffer and slot boundary alignment unit 332 via buses 334. Tail shared recirculation buffer and slot boundary alignment unit 332 is connected to the input of batcher sorting network 304 by bus 336, which has a width of S bus units in the depicted example. Networks 320 are ordinary banyan networks with added components being distinguishers, two one-hop buses, and multiplexers, which are described in more detail below in FIG. 11.

Output contest network 306 is employed to select 2k cells for each output in switch unit 300 in the depicted example. The remaining cells are either recirculated through front shared recirculation buffer 314 or discarded. The 2k selected cells are forwarded to M_banyan networks 320, which forward the cells to their destinations. Cells that are blocked within M_banyan networks 320 are recirculated through tail shared recirculation buffer 332 or delivered by dual bus 324 to the correct output port controller 326.

III. Cell Priority and Recirculation within the DbDest Switch

Figure 6:
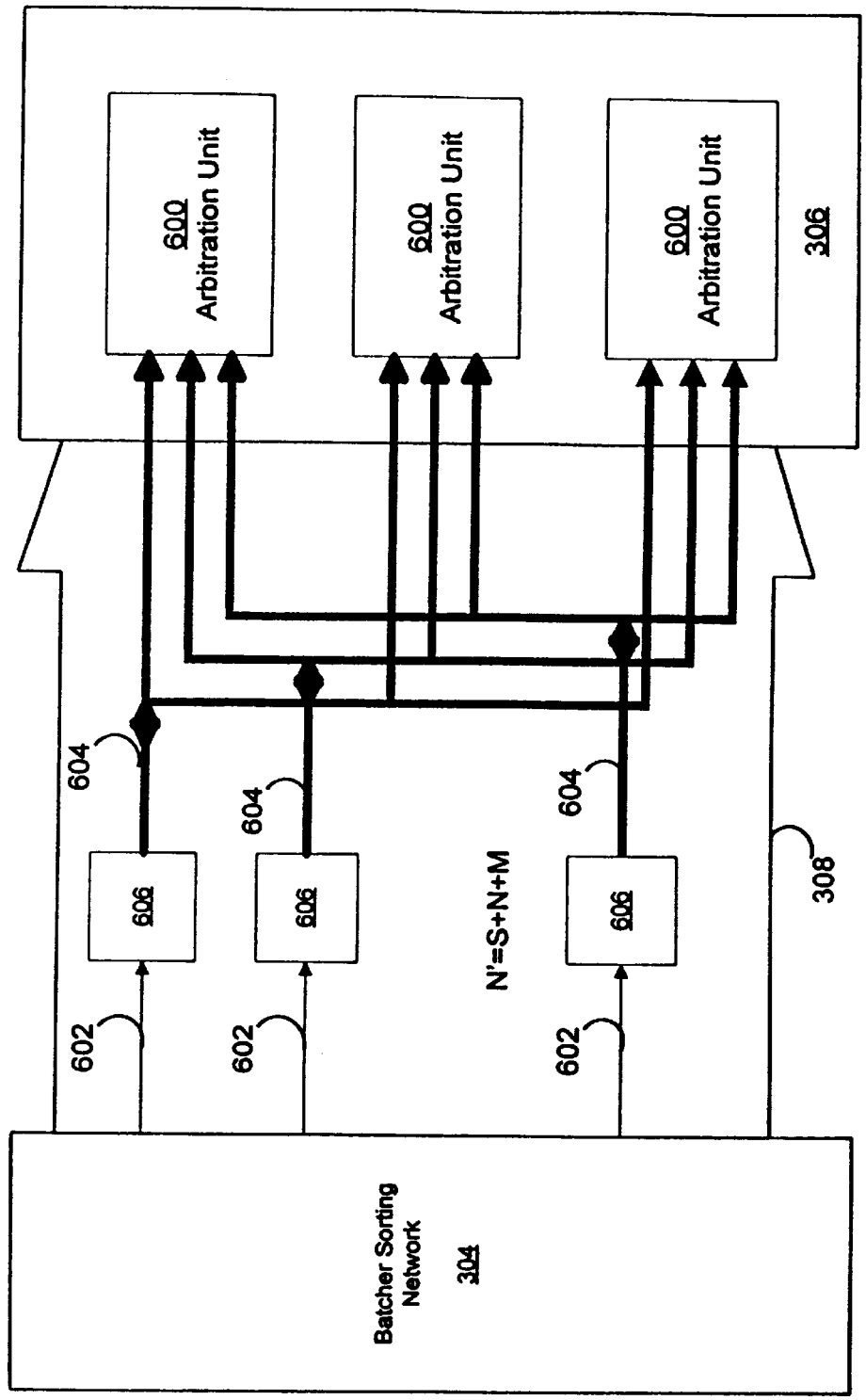
FIG. 6 depicts a block diagram illustrating request signals generated for cells within the switch fabric illustrated in FIG. 3 according to the present invention.
Figure 7:
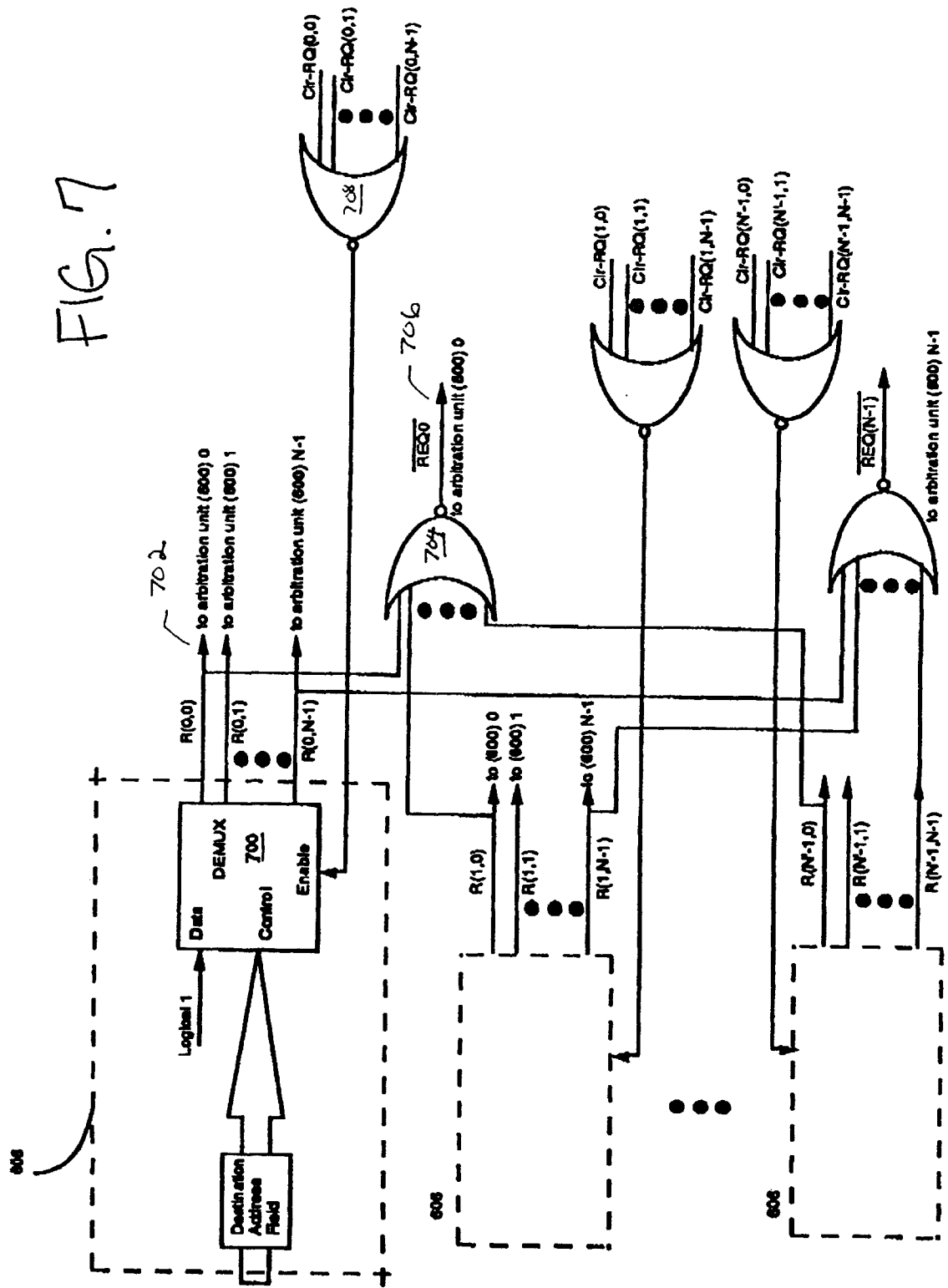
FIG. 7 is a data/signal unit is depicted according to the present invention.

Turning now to FIG. 6, a block diagram illustrating signals generated for cells within switch unit 300 to determine priority are depicted according to the present invention. Output contest network 306 includes a number of arbitration units 600. In the depicted example, output contest network 306 contains N arbitration units 600. Bus 308 contains data lines 602 connected to data/signal lines 604 through data/signal units 606. Each of the data/signal lines 604 are converted into data and control signals by data/signal units 606. A more detailed depiction of a data/signal unit 606 is shown in FIG. 7. In particular, data/signal unit 606 includes a demultiplexer 700, which receives data in the form of cells as an input from a data line 602. Although only three data/signal units 606 are illustrated in FIG. 6, N' data/signal units 606 are employed in the depicted example.

Consider data'signal unit 606 associated with data line 602 i, for each i from 0 to N'−1, demultiplexer 700 generates N R(i,j) signals 702 in which each of the signals is a zero except for the R(i,j) signal corresponding to the destination address associated with cell on line 602, where j may be from 0 to N−1. For example, if data line 602 1 has a cell with destination 7, then R(1,7) out of the N R(1) lines would be set equal to a logic "1" with the rest of the lines having a signal set equal to a logic "0". Additionally, these outputs are connected to NOR gates 704, which generate request (/Req) signals 706 to indicate that data is present on one of the lines comprising Ri lines to form signal lines 604. The output from each data/signal unit 606 is connected to all of the N arbitration units 600. The Enable in DEMUX 700 is connected to NOR gate 708, whose inputs CLR-RQ come from AND gates 804 discussed below.

Figure 8:
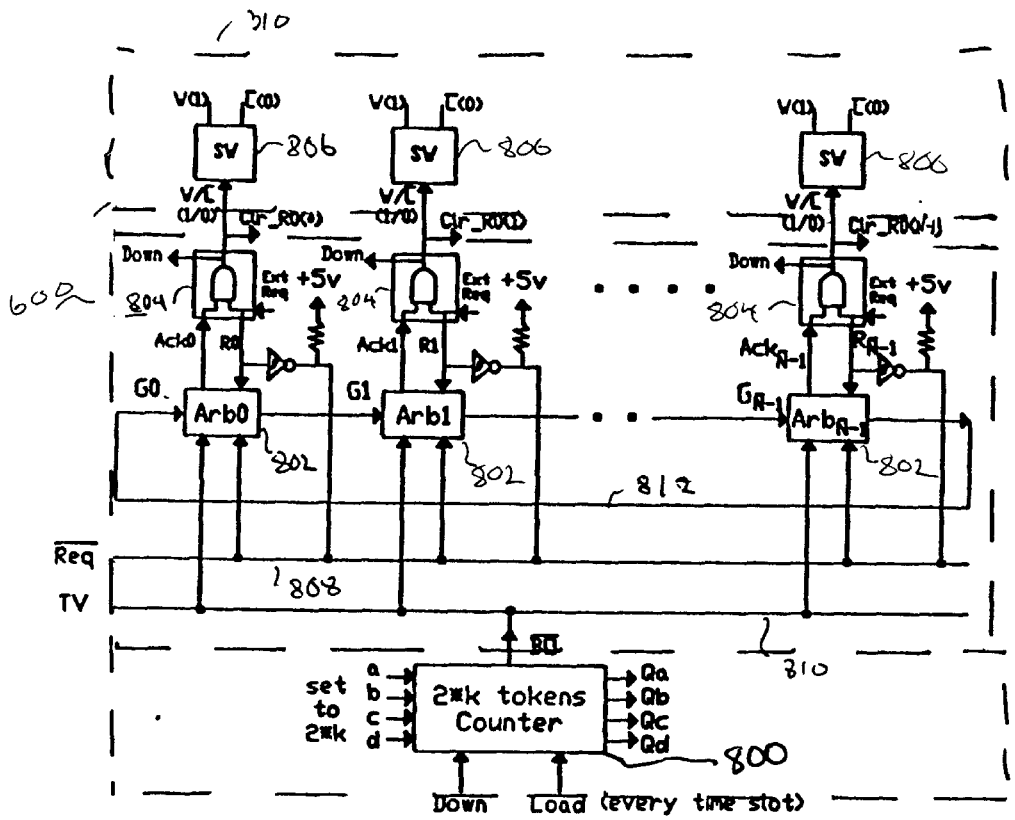
FIG. 8 depicts a block diagram of circuitry employed for priority determination according to the present invention.
Figure 9:
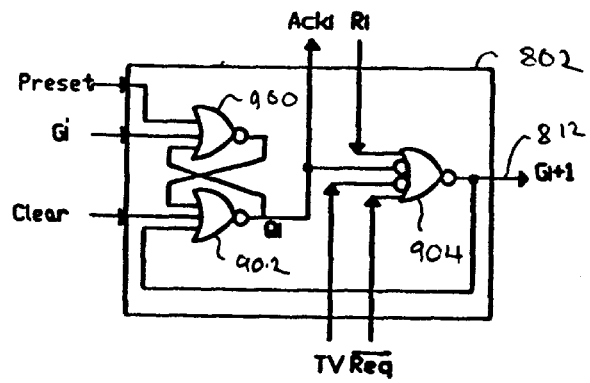
FIG. 9 is a logic diagram of an arbitration circuit depicted in FIG. 8 according to the present invention.

Turning now to FIG. 8, a block diagram of circuitry employed for priority determination is depicted according to the present invention. Arbitration unit 600 contains a counter 800, arbitration circuits 802, and AND gates 804. Switches 806 are located in concentration network 310. Arbitration unit 600 is employed to resolve contention caused by too many input ports (i.e., >2k in the depicted example) requesting the same output port simultaneously. Arbitration unit 600 addresses the problem of N' users with only 2k servers (where k<<N'). FIG. 9 is a logic diagram of an arbitration circuit 802 depicted in FIG. 8 according to the present invention. Arbitration circuit 802 includes NOR gates 900, 902, and 904.

If an external request is present, /Req line 808 is set to active, which is a low state or 0 in the depicted example. Two types of tokens are employed: recirculating tokens and counter tokens. At any given moment, at most, 2k counter tokens are present and only one recirculating token is present. The number of counter tokens are tracked by counter 800. The recirculating token is passed between arbiter circuits 802 through circulation bus 812. If counter 800 has at least one token, then counter 800 sets TV line 810 to a high state. An arbitration circuit 802 holding the recirculation token checks TV line 810. If TV line 810 is logic "0" or at a low state, then arbitration circuit 802 continues to monitor TV line 810. If TV line 810 becomes a logic "1", is in a high state, then arbitration circuit 802 also checks /Req line 808 to see if an external request is present. If no external request is present, arbitration circuit 802 keeps the recirculating token and continues to monitor both /Req line 808 and TV line 810. When both of these lines are active, an additional check is made as to whether a request is pending at arbitration unit 802 using an input connected to signal line Ri with i=0 to N'−1 in the depicted example. If /Req line 808 is active and Ri is not active, then arbitration circuit 802 passes the recirculating token to arbitration circuit block ((i+1)modN') 900. If /Req line 808 is active and Ri is active, arbitration circuit 802 sends an acknowledgement signal $Ack_i$ to request i in AND gate 804. When request i in AND gate 804 receives $Ack_i$, request i becomes a winner and causes counter 800 to count down by 1 to indicate that a counter token has been consumed. Meanwhile, request i in AND gate 804 resets Ri by sending a "1" signal on CLR-RQ line, and sends out the token-grant signal $G_{i+1}$ on circulation bus 812 which will be transferred to the next user who requests a counter token. The arbitration process continues until all 2k tokens have been used. When a request grabs a counter token, the request is directed to the winner pool through switch 806 in concentration network 310.

Initially, when the switch is first run, an arbiter circuit is randomly chosen to hold the recirculating token. At the beginning of each time slot, TV line 810 is set to high and request line 808 is set to high. Additionally, at the beginning of each time slot, the initial 2k value is loaded into counter 800 which is a countdown asynchronous counter. The position of the holder of the recirculating token changes randomly and dynamically as the arbitration process proceeds.

After being sorted according to the output, the cells go to output contest network 306 where output port contentions are resolved. For example, suppose that f cells are to access the same output port. Output contest network 306 chooses the 2k cells where k is the number of networks in parallel, with the highest priority among the f cells. In the case of no or equal priority, then cells are chosen randomly. Output contest network 306 marks each of the 2k cells as "winner cells" and marks the remaining f-2k cells as "loser cells". Output contest network 306 also marks each loser cell as either "to be recirculated" or "to be discarded". If a priority cell is used, then the M loser cells with the highest priority are marked to be "to be recirculated" and all other cells are marked to be discarded. If no priority is used or in the case of ties, the M cells are chosen randomly.

Figure 10:
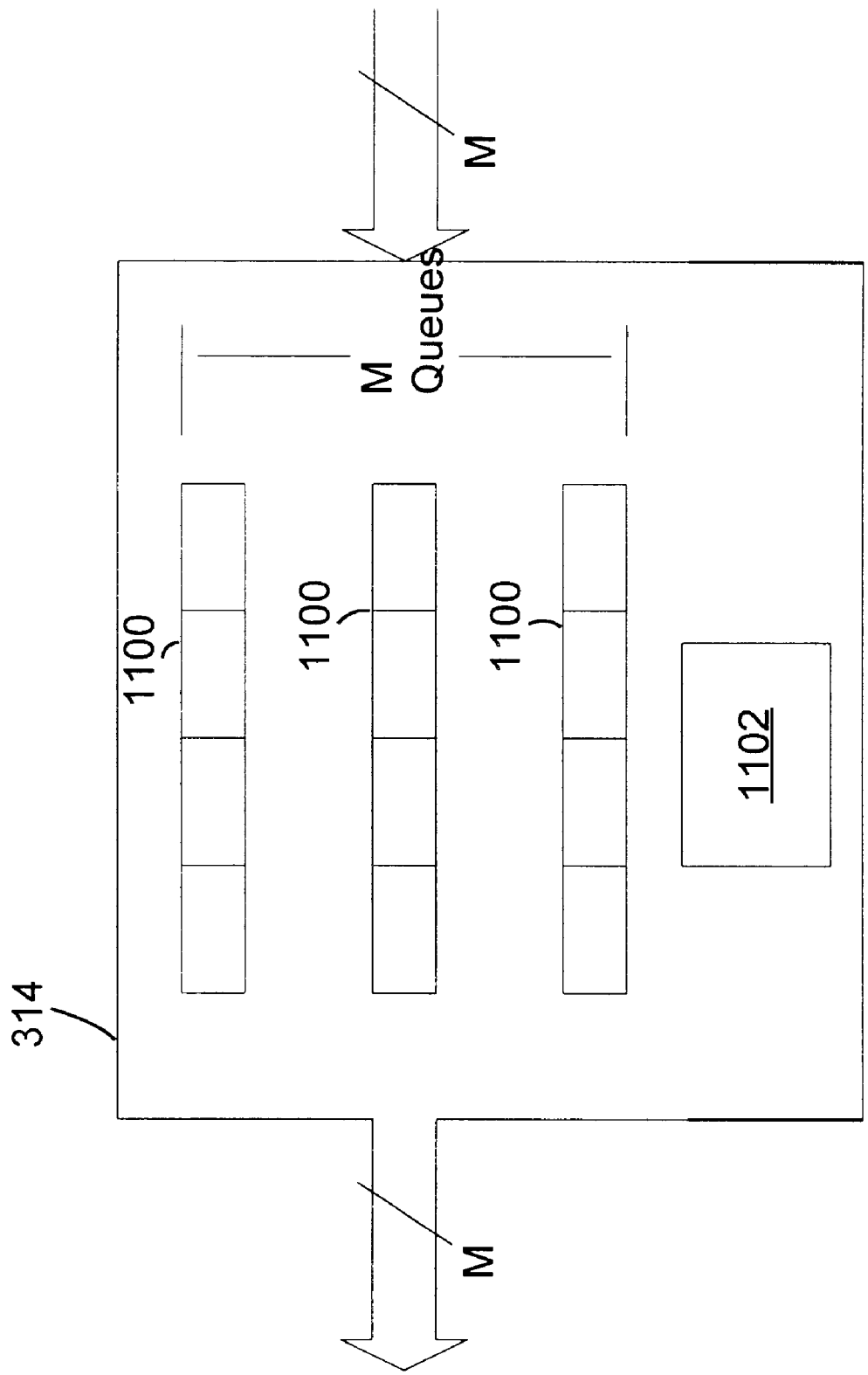
FIG. 10 depicts a block diagram of a front shared recirculation buffer according to the present invention.

Concentrator network 310 separates cells to be routed from cells to be recirculated or discarded and distributes the cells to networks 320, front shared recirculation buffer 314, or into a discard (not shown). The cells marked to be recirculated are fed back into the fabric through front shared recirculation buffer 314 includes queues 1100 as shown in FIG. 10. A total of M queues 1100 is contained within front shared recirculation buffer 314. Cells are stored here and sent back to batcher sorter network 304 at each slot by slot boundary alignment unit 1102. Head-of-line (HOL) blocking exists in FIFO queues in input port controllers 302. HOL blocking can reduce the throughput of switch fabrics because once the front head cell in an input queue loses the contention for an output port, the cell will remain in the input queue and wait for a retry in the next time slot. Thus, the cell blocks other cells in the queue from being served even though their destination outputs may be idled. According to the present invention, HOL effects is avoided by employing a common shared recirculation queue, front shared recirculation buffer 314. Upon arrival, cells are injected into the head of the FIFO queues in input port controllers 302. Cells that lose the contention for output ports remain in the switch fabric and go through a delay circuit, front shared recirculation buffer 314, to be recirculated back to dedicated input port and batcher sorting network 304. Front shared recirculation buffer 314 also synchronizes the cells with those arriving in the next time slot. Not all of the losing cells can be recirculated because of the expense of additional hardware cost and because recirculation may cause traffic congestion in subsequent time slots. On the other hand, to prevent massive cell loss, the size of the shared recirculation queue, front shared recirculation buffer 314 cannot be very small. Thus, a balance between shared recirculation queue size and cell loss must be made.

IV. Double Destination Switching

Figure 11:
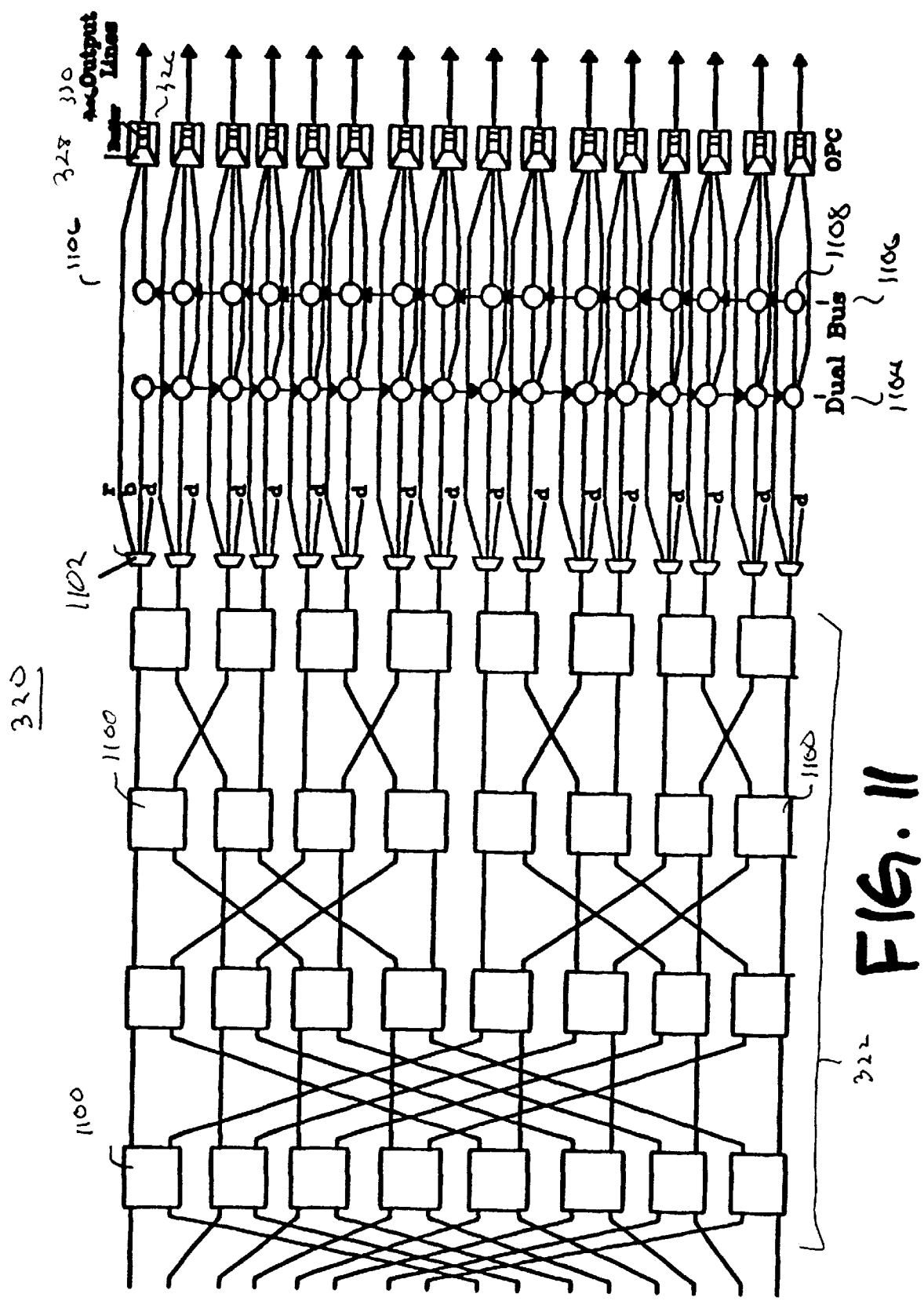
FIG. 11 is a block diagram of a network from FIG. 3 with output port controllers according to the present invention.
Figure 12:
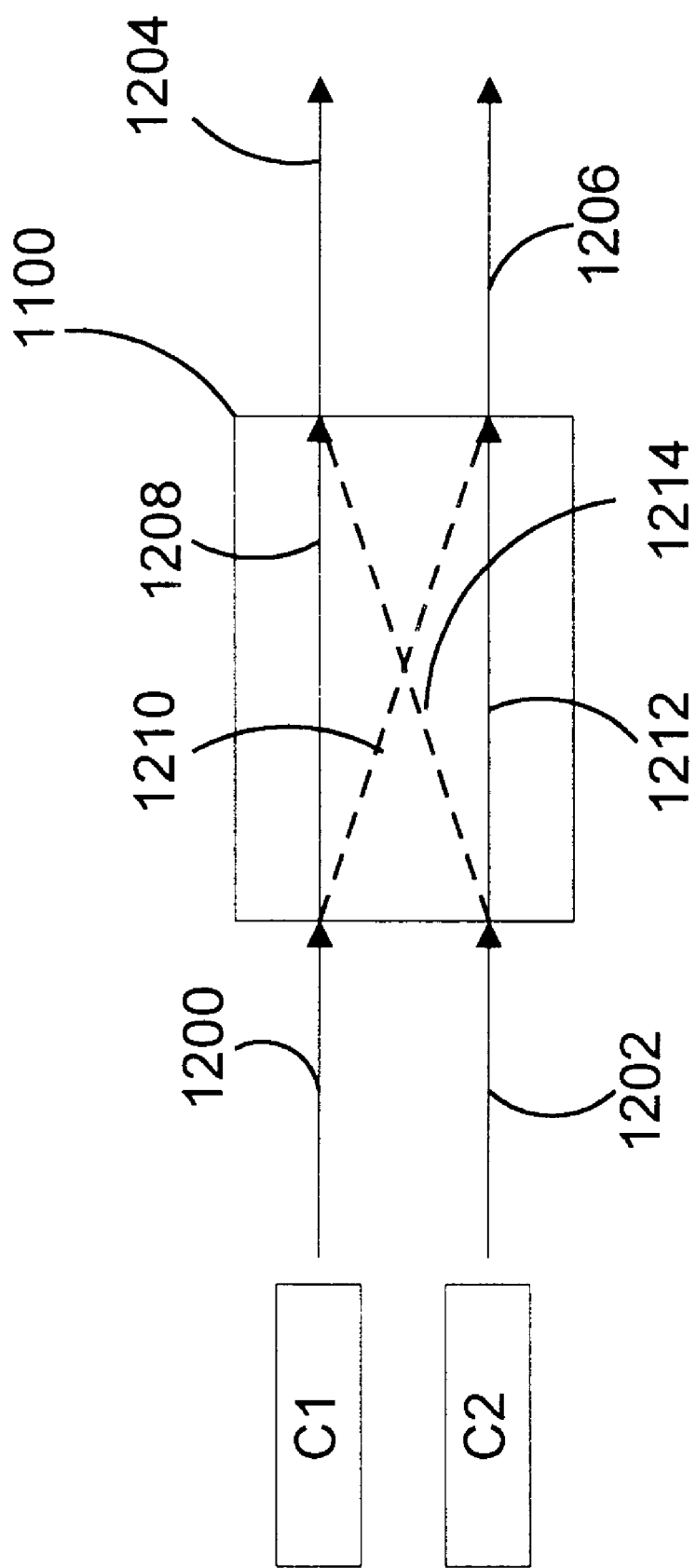
FIG. 12 depicts a block diagram of a switching element within a network from FIG. 3 according to the present invention.

Turning now to FIG. 11, a block diagram of a network 320 from FIG. 3 is depicted with output port controllers according to the present invention, network 320. As can be seen, banyan network 322, also called a single path switching matrix, includes switching elements 1100 with four stages. Although only four stages are depicted here, other number of stages may be employed according to the present invention. FIG. 12 shows a block diagram of a switching element 1100 from FIG. 11 according to the present invention. As can be seen, switching elements 1100 includes input lines 1200 and 1202 with output lines 1204 and 1206. A cell C1 on input line 1200 may follow either path 1208 or 1210. Path 1208 results in cell C1 exiting at output 1204 while path 1210 results in cell C1 exiting switching element 1100 at output 1206. A cell entering switching element 1100 at input 1202 may take path 1212, which results in cell C2 exiting switching element 1100 at output 1206. Path 1214 would result in cell C2 exiting switching element 1100 at output 1204.

If no priority service is requested, the setting of each switch element at any stage i in an M_banyan network is a function of three parameters, the busy bit(B), the conflict bit(C), and the ith bit of the destination address ($D_i$). On the other hand, if priority service is in effect, then the setting of each switch element is also a function of the priority field (P). Thus, a smart routing algorithm based on the header of each cell is used in the DbDest switch and is described as follows. Suppose that two cells, a and b, appear at the inputs of a 2×2 switch element at stage i.

1. If $B_a=B_b=1$ then
  1.1 If $C_a=C_b=0$ then
    1.1.1 If $P_a=P_b$ or no priority at all, then the switch is set according to either $D_{ia}$ or $D_{ib}$, randomly.
    1.1.2 If $P_a>P_b$, then the switch setting follows $D_{ia}$.
    1.1.3 If $P_a<P_b$, then the switch setting follows $D_{ib}$.
  If one of the cells has been misrouted in 1.1.1, 1.1.2 or 1.1.3, then set its conflict bit to 1.
  1.2 If $C_a=0$ and $C_b=1$, then switch setting follows $D_{ia}$.
  1.3 If $C_a=1$ and $C_b=0$, then switch setting follows $D_{ib}$.
  1.4 If $C_a=C_b32\ 1$, then switch setting follows $D_{ia}$ or $D_{ib}$ randomly.
2. If $B_a=1$ and $B_b=0$, then switch setting follows $D_{ia}$.
3. If $B_a=0$ and $B_b=1$, then switch setting follows $D_{ib}$.
4. If $B_a=B_b=0$, then no setting is required.

Figure 13:
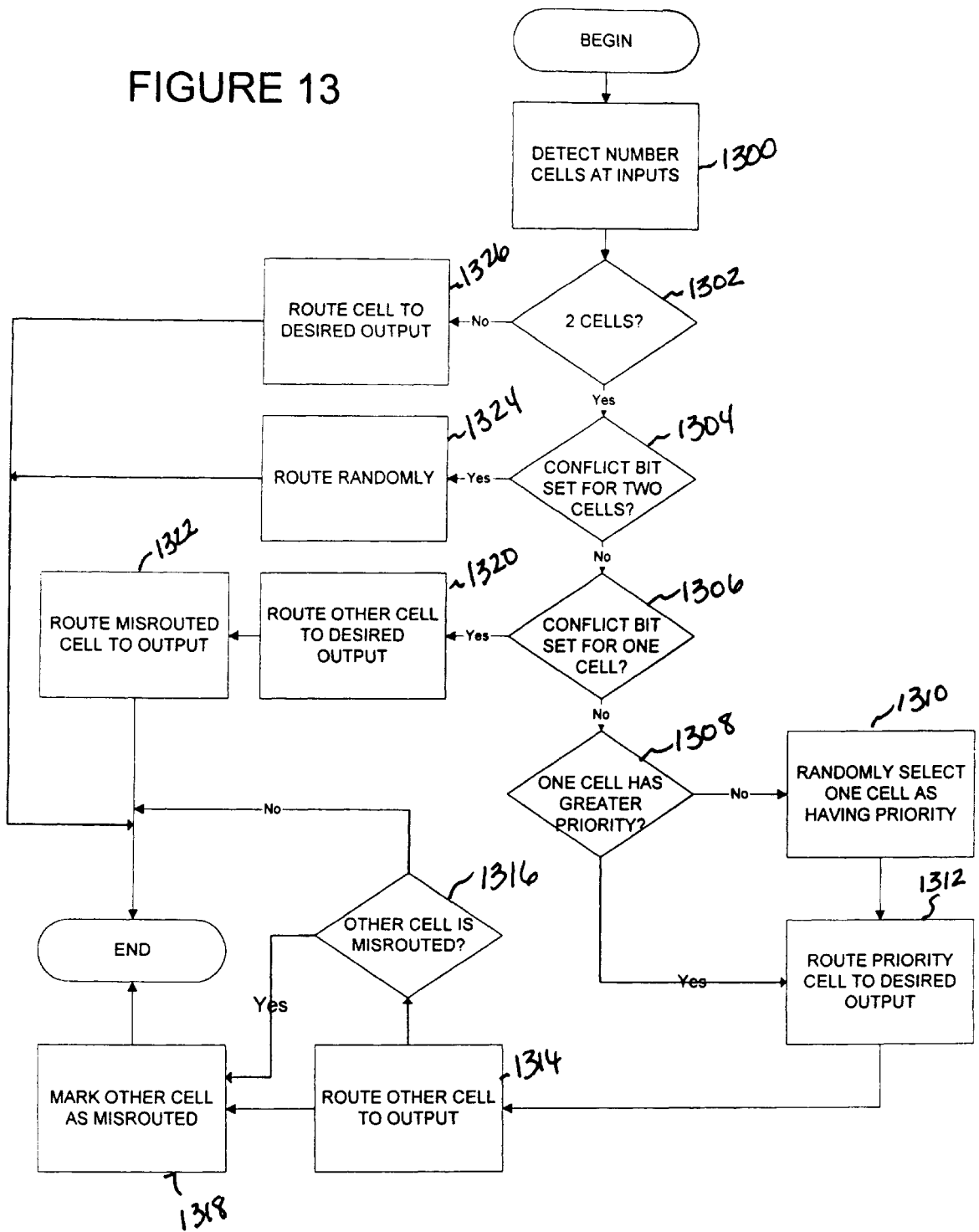
FIG. 13 is a flowchart of a process employed in routing cells within a switching element according to the present invention.

With reference now to FIG. 13, a flowchart of a process implementing priority service in a switch is depicted according to the present invention. The process begins by detecting the number of cells present at the inputs (step 1300). A determination is then made as to whether two cells are located on the input lines (step 1302). If two cells are present on the input lines, then a determination is made as to whether a conflict bit has been set for both cells (step 1304). As described above, a conflict bit indicates whether a cell has been misrouted. A cell has been misrouted when the conflict bit is set equal to one. If the conflict bit has not been set for both cells, then a determination is made as to whether a conflict bit has been set for one of the two cells (step 1306). If a conflict bit has not been set for either cell, then a determination is made as to whether one cell has greater priority over the other cell (step 1308). If neither cell has greater priority over the other cell, then one cell is randomly selected as having greater priority (step 1310). Thereafter, the cell with priority is routed to the desired output (step 1312).

With reference again to step 1308, if one cell has greater priority over the other, the process then proceeds directly to step 1312. Next, the other cell, with less priority is then routed to the other output (step 1314). A determination is then made as to whether the cell without priority is misrouted (step 1316). If the cell is misrouted, it is marked as misrouted (step 1318) with the process terminating thereafter. The process also terminates if the cell is not misrouted.

With reference again to step 1306, if the conflict bit has been set for one of the two cells, the cell in which the conflict bit is not set is routed to the desired output (step 1320). The other cell, the cell with the conflict bit set, is routed to the other output (step 1322) with the process terminating thereafter. With reference again to step 1304, if the conflict bit is set for both cells, then the cells are both routed randomly to the two outputs (step 1324) with the process terminating thereafter.

Turning back to step 1302, if only one cell is present at the input, then that cell is routed to the desired output (step 1326) with the process terminating thereafter.

Figure 14:
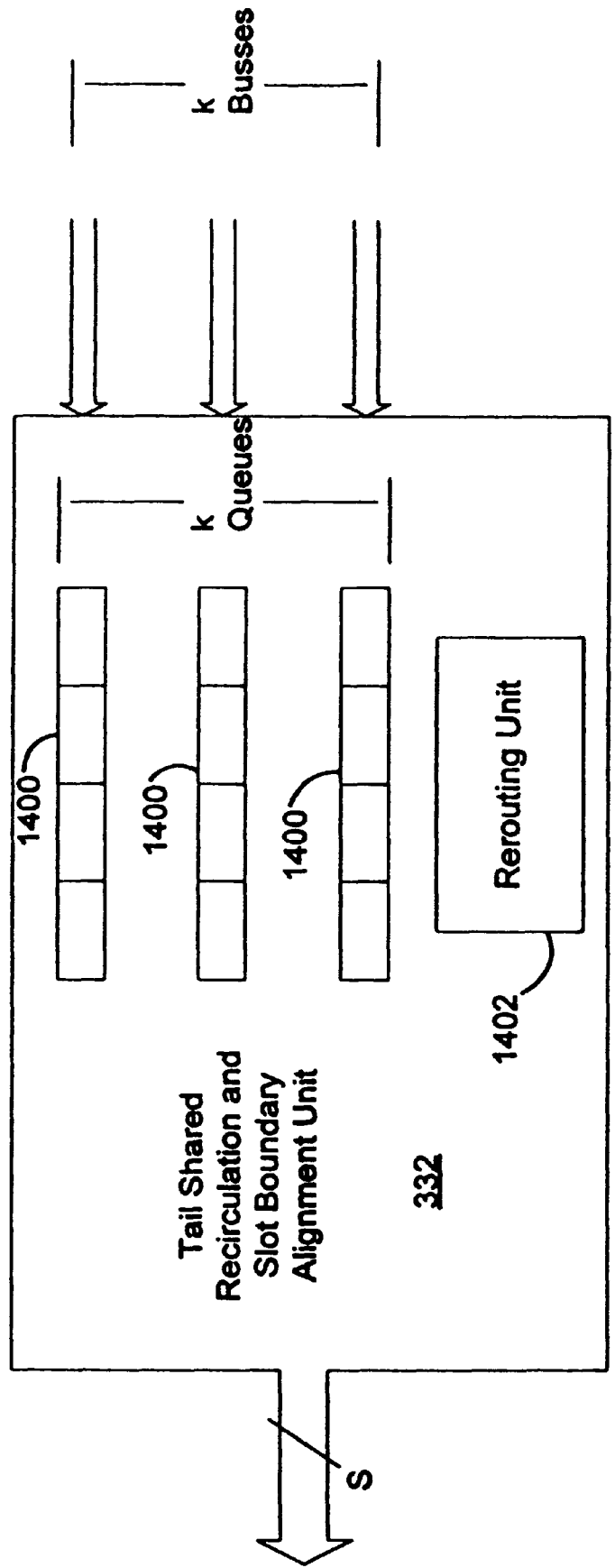
FIG. 14 depicts a block diagram of a tail shared recirculation buffer and slot boundary alignment unit according to the present invention.

With reference again to FIG. 11, at the last stage of banyan network 322, the outputs of each switching element 1100 are connected to distinguisher units 1102. Distinguisher unit 1102 will route the cell to one of three destinations. The cell is routed to reach its destination at output port controller 326. Each output port controller 326 includes a multiplexer 328 and a buffer 330 for outputting cells. The multiplexer 328 accepts cells from various networks 320 and places them within the buffer for sending the cell to its destination. In FIG. 11, connections from a single network 320 are shown for output port controllers 326 to reduce confusion. As implemented in the depicted example, in FIG. 3, each output port controller 326 has a connection to a network 320. Those additional connections are not shown in FIG. 11 to simplify the description of the present invention. Cells that are misrouted by one address or location from its intended destination, are routed by distinguisher 1102 to dual bus 324. Dual bus 324 includes two one-hop buses 1104 and 1106 with each of these buses containing a series of switches 1108. Bus 1104 routes cells down to the next output port controller while bus 1106 routes cells up to the next output port controller 326. Each switch 1108 determines whether to send the cell up one or down one on the bus. From there, the cell proceeds to the associated output port controller. Cells that are misrouted by more than one address location in the depicted example are either routed back to batcher sorting network through tail shared recirculation buffer and slot boundary alignment unit 332 or discarded. The cells are stored in K queues 1400 within tail shared recirculation buffer and slot boundary alignment unit 332, as illustrated in FIG. 14. In every ATM cell time slot, rerouting unit 1402 forwards the S cells with the highest priority to bus 336 and discards the remaining cells. In case of ties, or in case priority is not used, rerouting unit 1402 chooses randomly from among the cells.

Figure 15:
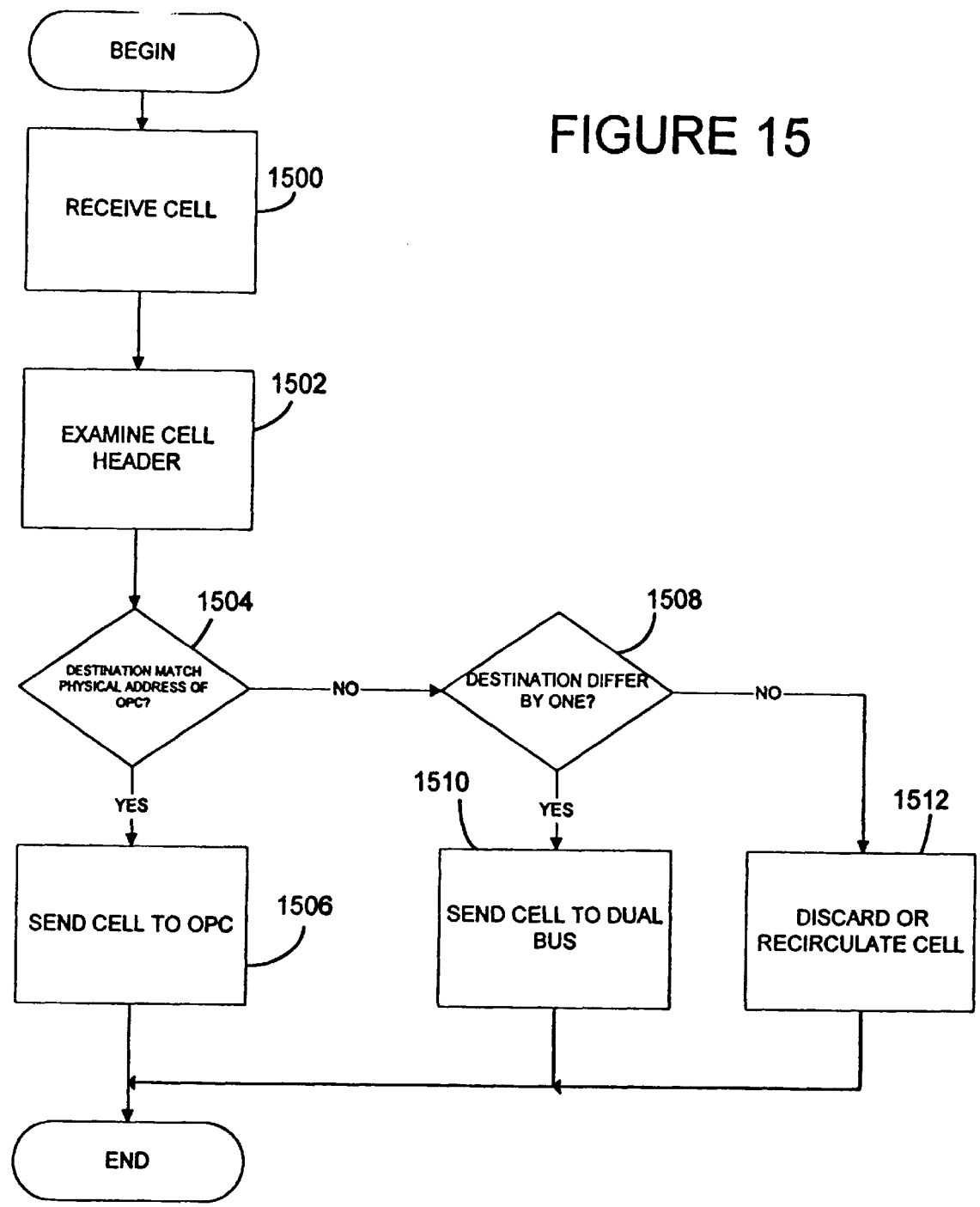
FIG. 15 is a flowchart of a process followed by distinguishers in routing cells according to the present invention.

With reference now to FIG. 15, a flowchart of a process followed by distinguishers 1102 in routing cells is depicted according to the present invention. The process begins by receiving a cell for routing (step 1500). The process then examines the header of the cells (step 1502). Distinguishers 1102 examine the header of each cell to determine the destination of the cell. The comparison is that of the physical address of the output linked to the output port controller. Each output in the last stage has address associated with it from 0 to N−1. A determination is then made as to whether the destination matches the physical address of the output port controller (step 1504). If the destination does match, the process then sends the cell to the output port controller (step 1506). Otherwise, a determination is made as to whether the destination differs by one (step 1508). If the destination differs by one from the output port controller associated with the distinguisher, the process then sends the cell to dual bus 324 for routing (step 1510). With reference again to step 1508, if the destination does not differ by one, the process then discards or puts the cell into tail shared recirculation buffer and slot boundary alignment unit 332 (step 1512) with the process terminating thereafter. The process determines which cell to discard or reroute as follows:

The process chooses the S cells with the highest priority to forward to unit 332 and discards the remaining cells. In case of ties, or in case priority is not used, the process chooses randomly from among the cells.

According to the present invention, k networks 320 are used in parallel. Each network 320 includes a N×N banyan network 322 that routes a set of sorted input cells to their destination without any internal blocking if no output port contention occurs. Each banyan network 322 has been modified to allow two cells per destination. This is accomplished by adding the extra stage, dual bus 324, to the end of each banyan network 322. The dual bus consists of two buses in which one bus runs upward and the other runs downward as depicted in FIG. 11. Whenever a cell is misrouted to the neighbors of its destination, associated with a physical output, the cell will be delivered to its destination buffer through this dual bus in a negligible one hop bus switch time. The effectiveness of recirculation queues, such as front shared recirculation buffer 314 in FIG. 3 can diminish under heavy bursty traffic. Such a situation occurs because the recirculation queue becomes overflooded in bursty traffic. As a result, lower-priority service demands are blocked.

Although the depicted example illustrates two buses with switches that can route cells misrouted by one hop or one physical output, cells misrouted by more than one hop or physical output still may be routed to the correct output according to the present invention. Such routing would employ additional buses or more sophisticated switches in the buses.

V. Linked Outputs in DbDest Switch

A link group serving a high bandwidth pipe can resolve the overflooding of the recirculation queue. Grouping links of outputs has many advantages over traditional unilink routing. Bursty traffic can be soothed by multiplexing several bursty calls onto a trunk group to achieve high bandwidth utilization. Additionally, high bit-rate services, such as interoffice communication networks can be supported. Additionally, trunk group usage needs to be monitored instead of observing each individual link. As a result, costs can be reduced. Moreover, throughput can be increased in input queuing switches.

Figure 16:
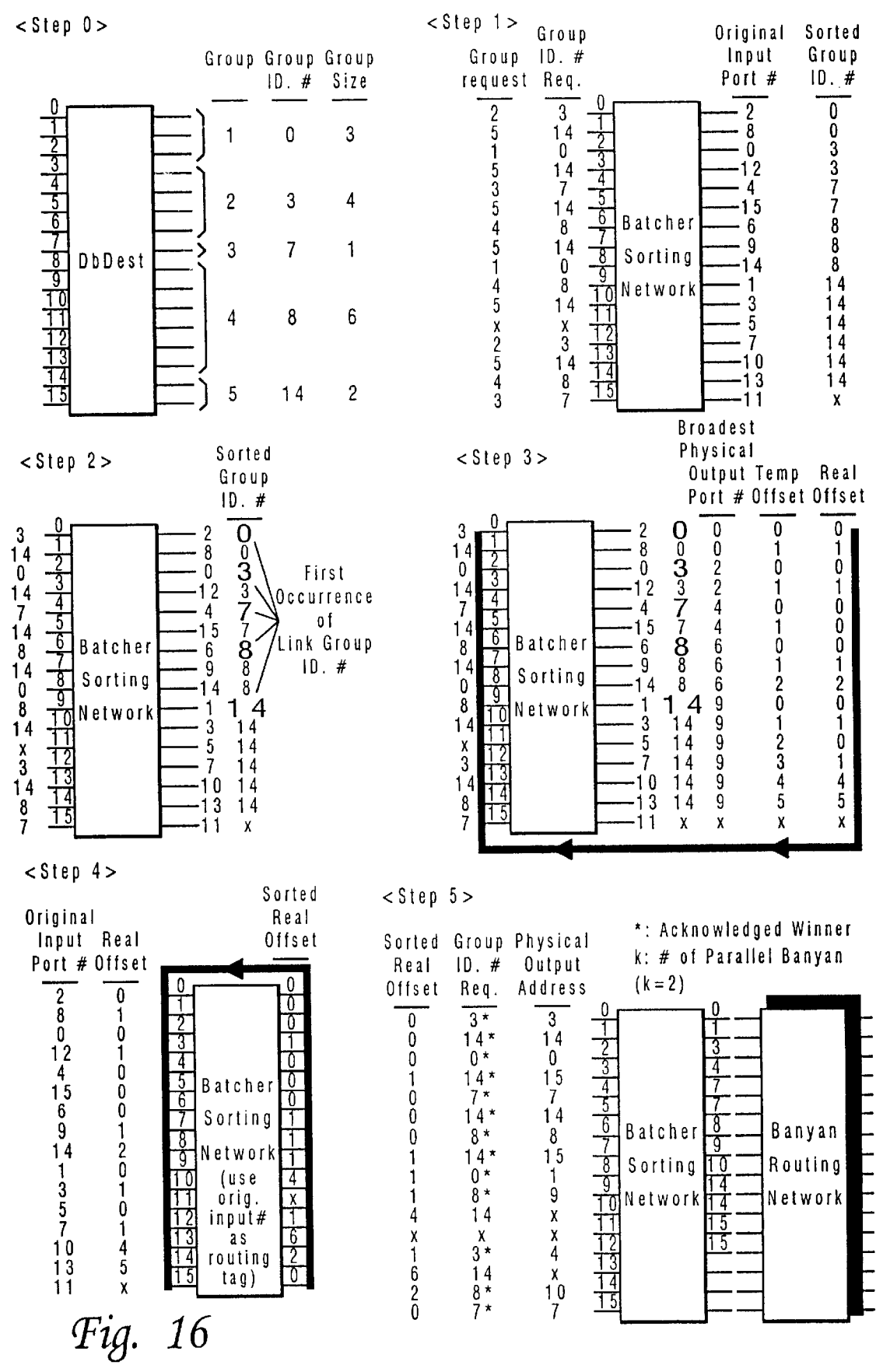

With reference now to FIG. 16, a diagram illustrating steps in a multilink access algorithm is depicted according to the present invention. The process is executed in every time slot during the operation of switch fabric 300. Before the process begins, the physical output port numbers are separated into groups as selected by the user or designer. A link group is identified by the smallest physical output port number contained within it. All members in a link group have consecutive physical output port numbers. A link group size $S_{gi}$ will be associated with link group i. This can be seen in step 0 in FIG. 16.

Each cell that comes out from an input port controller 302 with some destination output link group g will have a bit "0" attached as a prefix to the binary representation of g. If the cell has no destination, then the cell will have a prefix of "1". Then, the cells retain their input port numbers and are routed through batcher sorting network 304 by using the prefix bit and the link group number as the routing tag. The output of batcher sorter network 304 is a sequence of cells sorted by their link group numbers on the top followed by those cells that have no destinations at the bottom because the latter have larger routing values. Thus, cells with common link group numbers become adjacent. Moreover, the cells with the same link group number are sorted arbitrarily. If priority service is used, then cells in the same link group number can be sorted by appending priority bits at the end of each link group number. Step 1 in FIG. 16 illustrates the output of batcher sorter network 304 where the output is a sequence of sorted link group numbers followed by cells with no destinations. The cells with no destinations are marked with a "X" in the sorted group ID column in step 1 of FIG. 16.

In step 2 in FIG. 16, starting from output 0 of batcher sorter network 304, for each group ID i, switch fabric 300 locates the first cell in i. The locating of the first cell can be done by requiring each output q to send downstream the link group number of the cell at q through a dedicated bus.

Figure 17:
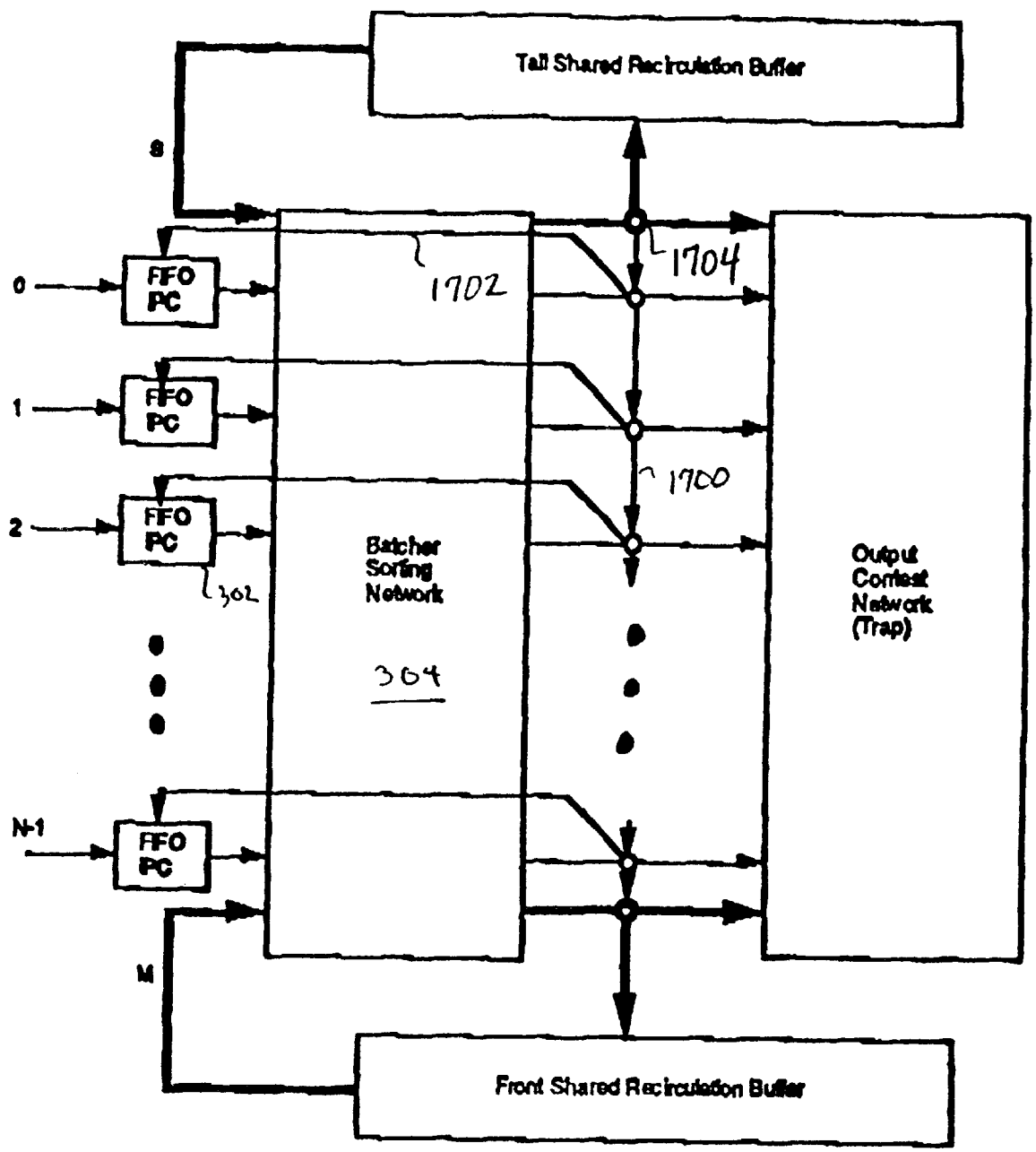
FIG. 17 is a block diagram of a portion of the switch fabric illustrated in FIG. 3, depicting data flow employed in the multilink access algorithm.

With reference to FIG. 17, a block diagram of a portion of switch fabric 300 from FIG. 3 in which data flow is depicted according to the present invention. Bus 1700 is the dedicated bus through which each output q from batcher sorting network 304 is sent. Each output q compares the sent group number with the received group number. Those outputs where the link group numbers do not match can be identified. With reference again to step 2 in FIG. 16, the first occurrence of each link group number is identified and marked with a capital font as illustrated in step 2 of FIG. 16 at the output of batcher sorter network 304.

With reference to step 3 in FIG. 16, each identified output port q at the first occurrence of each link group number broadcasts q's physical port number downstream to all members in q's family (i.e., ports with the same output link group number). Temporary offsets are computed for the cells within each link group number by subtracting the received broadcast number from the physical output port number at each output port. Bus 1700 contains a series of switches 1704, and the subtractions are performed in the switches 1704. Also, switches 1704 compute the real offsets for cells C in link group I as follows:

If the temporary offset $Of_{ctemp}$ of C is smaller than or equal to $S_{gi}*K$ (where $S_{gi}$ is the group size of link group I and K is the number of parallel banyan networks), then the real offset $Of_{creal}$ of C will be the remainder of the temporary offset divided by $S_{gi}$ (i.e., $Of_{creal}=Of_{ttemp}$ MOD $S_{gi}$).

Otherwise, the real offset of C is equal to the temporary offset of C.

As can be seen with reference still to step 3 in FIG. 16, six requests are present for link group number 14 with K=2. The real offsets of request 1 through 4 are computed by $Of_{itemp}$ MOD 2 because their temporary offsets are smaller than or equal to $S_{gi}*K=2*2$. The real offsets of requests 5 and 6 are equal to their temporary offsets. The cells and their real offsets are then fed back to input port controllers 302 associated with batcher sorter network 304 through lines 1702 as depicted in FIG. 17.

With reference next to step 4 in FIG. 16, batcher sorter network 304 sorts the cells with real feedback offsets by using the retained input port numbers as routing tags. The cells now become sorted in their original input sequence. Then, the cells at output ports of batcher sorter network 304 are fed back to input port controllers 302.

Referring next to step 5 in FIG. 16, the process for identifying winners and losers between cells is illustrated. For every input port p that receives a feedback offset, c(p) is the cell at p. If the feedback real offset of c(p) is smaller than the lint group size of the destination of c(p), then c(p) is labeled a "winner" else c(p) is labeled a "loser". Then the real offset of c(p) and the request output link group ID of c(p) are added together to form the physical output port address for c(p). Next, all cells are then sent through to concentrator network 310. Concentrator network 310 sends all winner cells to networks 322 as illustrated in FIG. 3. Loser cells are either discarded or sent to front shared recirculation buffer 314 through bus 316 and finally return to batcher sorting network 304 through bus 318. With reference again to step 5 in FIG. 16, cells at input ports 1, 3, 5, and 7 are marked "winner" for access to link group number 14. Each of their physical output port addresses is the sum of the real offset and the link group ID. On the other hand, cells at inputs 10 and 13 are marked with the label "loser".

Figure 18:
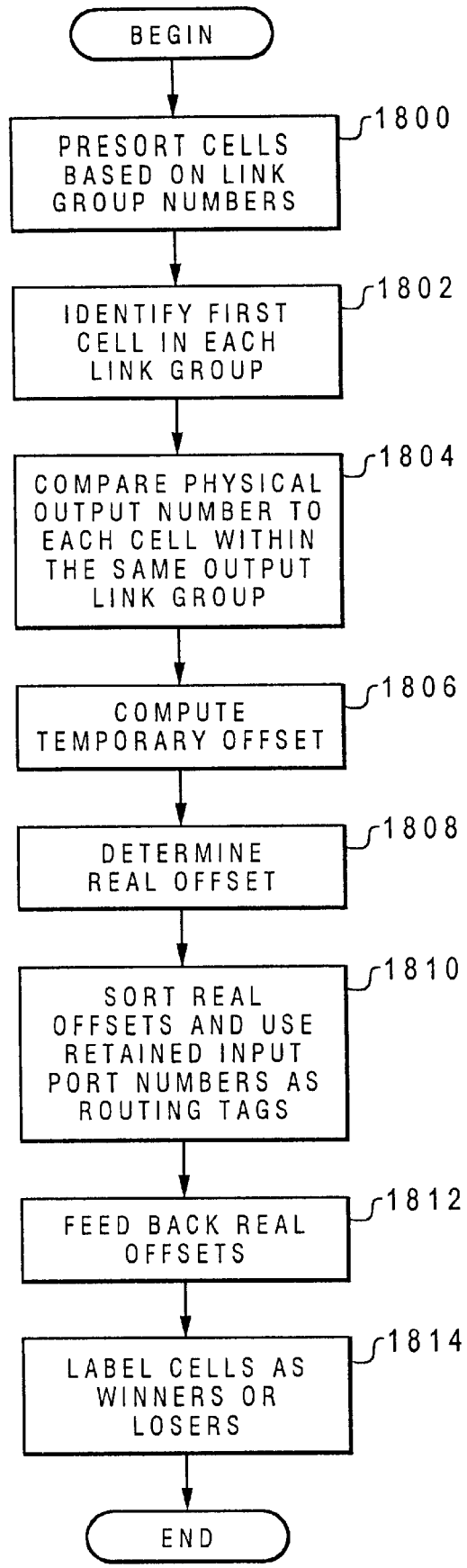
FIG. 18 depicts a flowchart of the multilink access algorithm according to the present invention.

With reference now to FIG. 18, a flowchart of a process for performing a multilink access algorithm is depicted according to the present invention. The process begins by sorting cells based on link group numbers (step 1800). Thereafter, the first cell in each group with respect to the outputs from a batcher sorting network are identified (step 1802). Thereafter, the first identified cell's physical output number is compared to each cell within the same output link group (step 1804). Thereafter, a temporary offset is computed by subtracting the physical output port number of the first cell in each link group from the physical output port number for each cell within a link group (step 1806). Thereafter, a real offset is determined (step 1808). Then, the offsets are sorted by using the retained input port numbers as routing tags (step 1810). Thereafter, the real offset at the output ports are then fed back into the corresponding input ports of the batcher sorting network (step 1812). Then, cells at the input port controllers are labeled as winners or losers (step 1814) with the process terminating thereafter.

VI. Fault Tolerance and Redundancy in DbDest Switch

Figure 19:
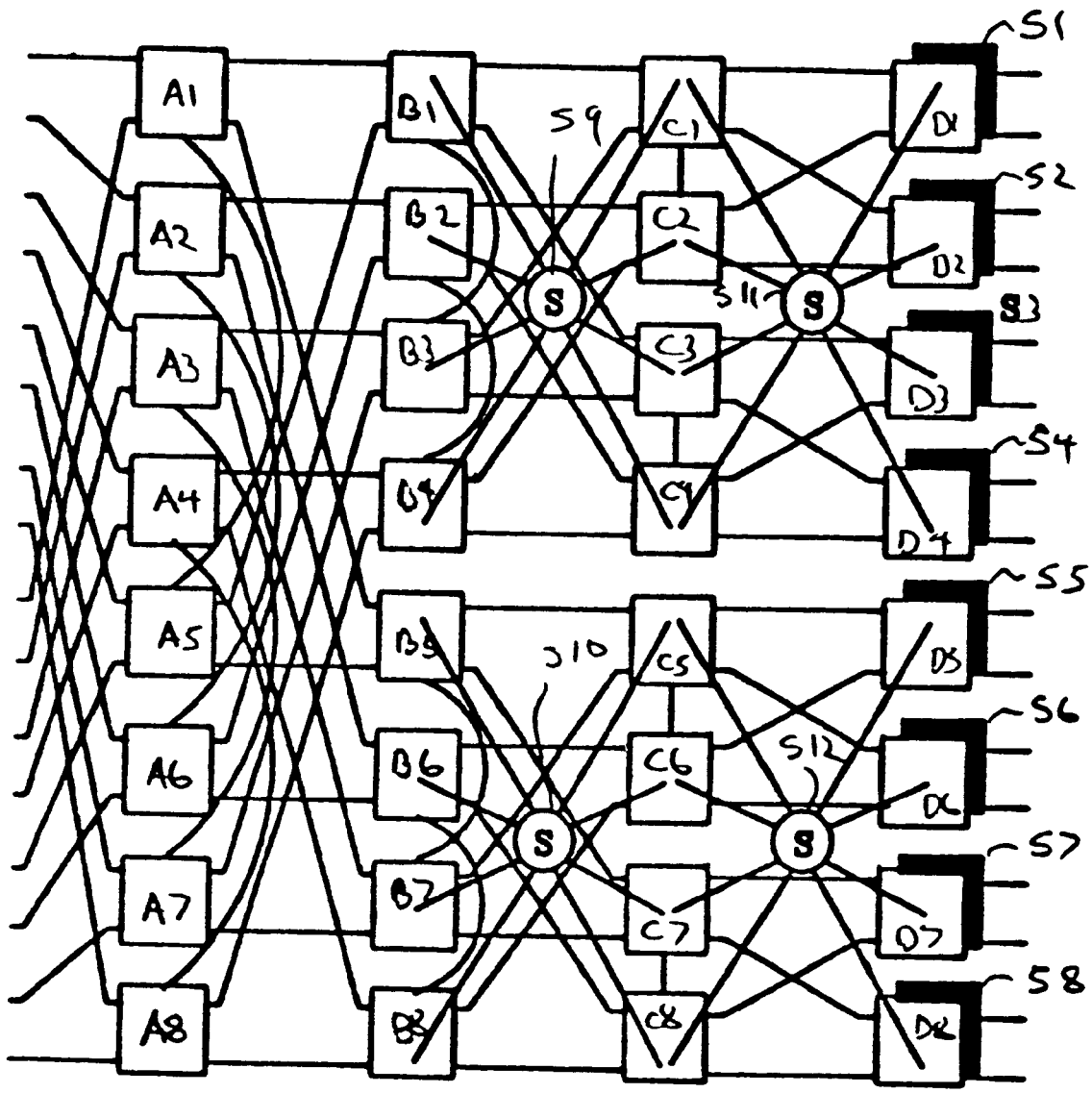
FIG. 19 is a diagram illustrating a fault tolerance configuration for a modified banyan switch according to the present invention.

With reference now to FIG. 19, a block diagram of a fault tolerance configuration for a modified banyan switch is depicted according to the present invention. This configuration places redundant switch components throughout the whole switch fabric to allow recovery from single or multiple failures. As can be seen, banyan network 1900 includes 32 typical switch elements A1–A8, B1–B8, C1–C8, and D1–D8. In addition, spare switches S1–S12 are included for redundancy. In addition to spare switches, additional links are provided between existing switches. Switch A1 has an additional link to switch A5, switch A2 has an additional link to switch A6, switch A3 has an additional link to switch A7, and switch A4 has an additional link to switch A8. In stage 2, switch B1 has an additional link to switch B3, switch B2 has an additional link to switch B4, switch B5 has an additional link to switch B7, and switch B6 has an additional link to switch B8. In stage 3 of banyan network, switch C1 has an additional link to switch C2, switch C3 has an additional link to switch C4. Also, switch C5 has an additional link to switch C6 and switch C7 has an additional link to switch C8. In stage 4, each of the switches D1–D8 has an additional spare switch, spare switches S1–S8, associated for redundancy. In the depicted example, switches D1–D8 and spare switches S1–S8 may be implemented as a single set of dual switches in which one switch is the master switch and provides normal operation while the other switch is the slave switch and comes into service when the master switch fails.

For an N×N M_banyan network, there are $\log_2 N$ stages, and each stage consists of N/2 switch elements, so that the M_banyan needs $(N/2)\log_2 N$ switch elements in total. With four M banyan networks in parallel according to the present invention, winning cells that come out of the concentrator will be distributed into these four parallel M_banyan networks. Thus, for each M_banyan network, only twenty five percent of the input ports are utilized. Hence, many idle switch elements can serve as spare units for the active switch elements.

The fault tolerance scheme illustrated in FIG. 19 is described in more detail as follows:

1. In an N×N M_banyan network, stages are labeled from left to right as $\log_2 N-1$ to 0, and label each switch element in a stage from top to bottom is labeled as 0 to N/2−1. Hence, each switch element will have a two dimensional coordinate (i,j), wherein i=$\log_2 N-1$ to 0, and j=0 to N/2−1.

2. For each stage i excluding stage 0, which is treated separately, switch elements (ij) and $(i,j+2^{i-1})$, form a pair to cover for each other and serve as a replacement unit when one of them fails. Moreover, for each stage i, wherein i≠0 and i≠$\log_2 N-1$, the pair $[(ij),(i,j+2^{i-1})]$ share an additional common spare switch element with the pair $[(i,j+1), (i,j+1+2^{i-1})]$ to deal with the cases when (i) both elements in a pair fail simultaneously and (ii) only one element fails but the good element has to process cells coming from its two input ports, so that no resource in this good element is left for serving the cells from the bad element. For stage $\log_2 N-1$, since only the upper half of the stage will be used to handle incoming cells, the above case (ii) situation will never happen.

3. The scheme we described in item 2 above requires $N/8(\log_2 N-2)$ additional switch elements for an N×N M_banyan switch. For very large values of N, the number of additional switch elements will be 25% of the number of switch elements in the original network, since $$\lim_{N \to \infty} \frac{\frac{N}{8}(\log_2 N - 2)}{\frac{N}{2}\log_2 N} = 0.25.$$

4. In stage 0, each switch element can be replaced by a dual switch unit, one switch is called the master switch and provides normal operation, while the other switch is called the slave switch and will come into service when the master switch fails.

Cells might be lost due to the output port contention or internal blocking of the M_banyan networks 320. Following the examples, simulations were run to obtain results for cell loss in a switch configured according to a preferred embodiment of the present invention as a function of various system parameters, such as the size of the front common shared recirculation buffer 314 (M), size of the tail common shared recirculation queue 322 (S), and the number of the networks 320 in parallel, k. The results were obtained by running simulations on the Cray Y-MP supercomputer and using recursive programming techniques. The examples below are simulations of single switch units.

VII. EXAMPLES

A. Example
Cell Loss Under Independent Uniform Traffic

In independent uniform traffic, the arrival of cells at input ports is governed by independent and identical Bernoulli processes of probability p, and the requested output port for a cell is uniformly selected among all output ports. The term offerload is used to denote p. Hence, each packet has equal probability 1/N of being destined to any given output, and successive packets are independent.

Figure 20:
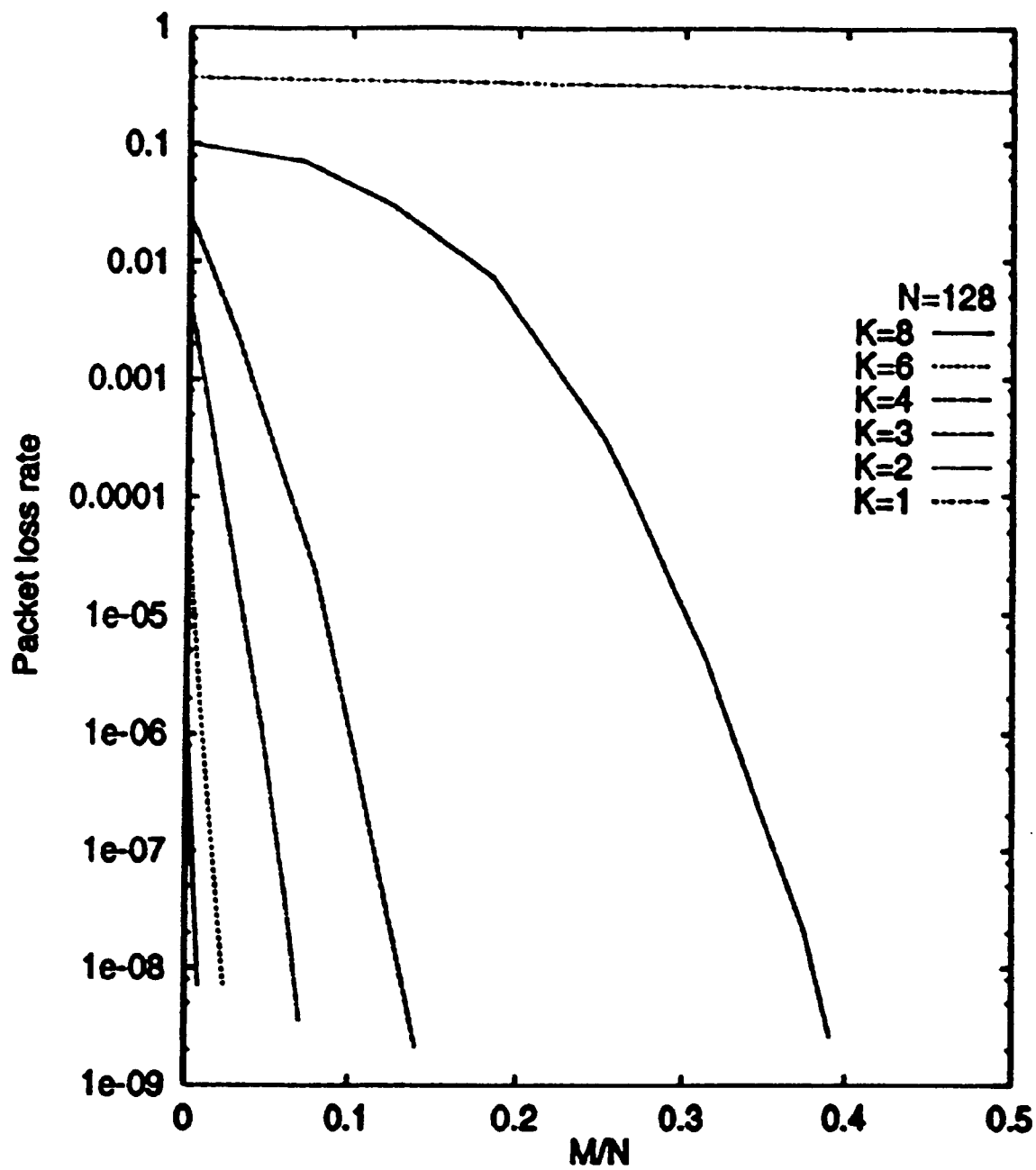
FIG. 20 is a plot of packet losses in a SunShine switch unit with various multiple parallel banyan networks under a full load of uniform traffic.

In the SunShine switch unit, the packet loss rate is a function of M/N for different input offerloads p. For a single banyan network (k=1) of size N=128, at high offerload when p is in the range of 0.8 to 1.0, the packet loss rate remains quite high even if the M/N ratio increases to 0.8 or higher. With reference to FIG. 20, a plot of packet loss rates in a SunShine switch unit with various multiple parallel 128×128(N=128) banyan networks as a function of M/N under full load of uniform traffic is depicted. More information on the SunShine switch unit is found in J. N. Giacopelli, J. J. Hickey, W. S. Marcus, and W. D. Sincoskie, *SunShine: A High-Performance Self-Routing Broadband Packet Switch Architecture*, IEEE J. Select. Areas Commun., Vol. 9, pp. 1289–1298, October 1991. This result is expected because the throughput of batcher sorting network 304 and banyan network 322 is limited to 0.58 at full load due to the output conflict, which is discussed in M. J. Karol, M. G. Hluchyj, and S. P. Morgan, *Input verses Output Queuing on a Space-division Packet Switch*, IEEE Trans. Commun., Vol. 35, December 1987. On the other hand, at low offerload, when p is less than 0.4, the SunShine switch unit can easily achieve the usually acceptable loss rate of $10^{-6}$ with an M/N value of about 0.3. As the number of the parallel banyan networks k increases, significant performance improvement occurs as shown in FIG. 20 where the packet loss rate at full load under uniform traffic is plotted as a function of M/N for various k values. With k equal to four, and M/N about 0.06, a loss rate of $10^{-6}$ is achievable.

Figure 21:
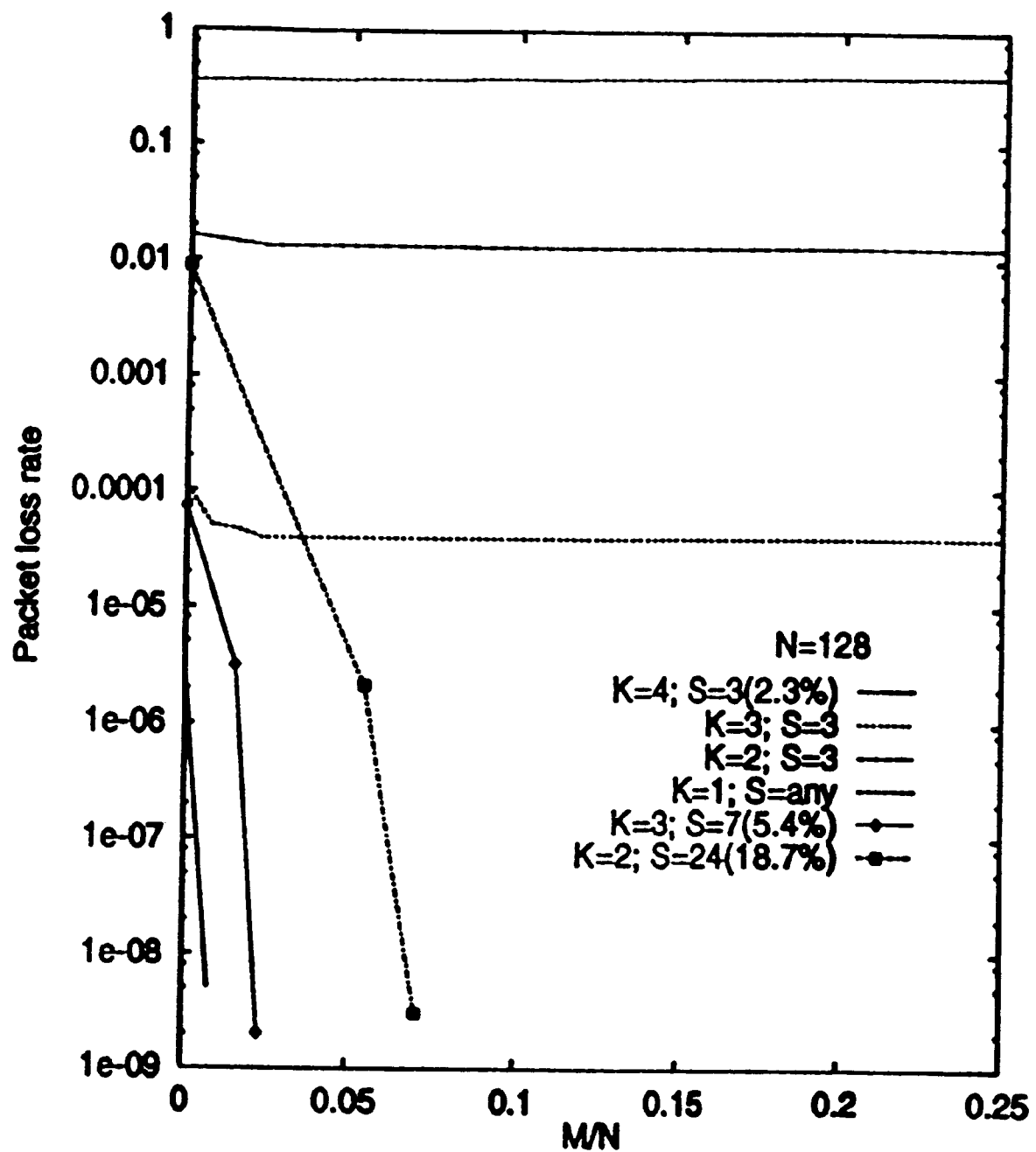
FIG. 21 is a plot of packet loss rates in a DbDest switch unit with various multiple parallel modified banyan networks under full uniform traffic according to the present invention.

In accordance with a preferred embodiment of the present invention, k is equal to 4. Turning to FIG. 21, a plot of packet loss rate in a DbDest switch unit with various multiple parallel 128×128(N=128) M_banyan networks and various S values as a function of M/N under full uniform traffic is depicted according to the present invention. As FIG. 21 shows, for k=4, the performance of the DbDest switch unit reaches a $10^{-9}$ packet loss rate with S=3 (2.3% of N) and M/N=0.8% (M=1). In order to show the effect of the value of S on the performance of the DbDest switch, simulations for the cases when k=2, and k=3 were ran. The packet loss rates were plotted in FIG. 21 lor the DbDest switch unit with two and three parallel 128×128 (N=128) M_banyan networks versus different M/N ratios for different S values at full load under uniform traffic. With a small size of the tail common shared recirculation buffer (S≦3), even ii the M/N ratio increases to 0.5, the network is hardly able to reach the desired loss rate value at $10^{-6}$. As S increases to 7 (S=24 in k=2 case), with a small M/N ratio of about 0.023 (M/N=0.07 in k=2 case), the system can achieve the loss rate of $10^{-9}$. Thus, a size of about 3 packets (9 in k=2 case) at the front common shared recirculation buffer M is sufficient. The reason for such an outcome is that in DbDest switch unit, each M_banyan network tries to accommodate two cells per destination. If k is only 2, a great deal of internal blocking is unavoidable, causing a large number of cells to be misrouted. Thus the size of the tail recirculation queue needs to be increased when k decreases in order to maintain a desired loss rate.

Figure 22:
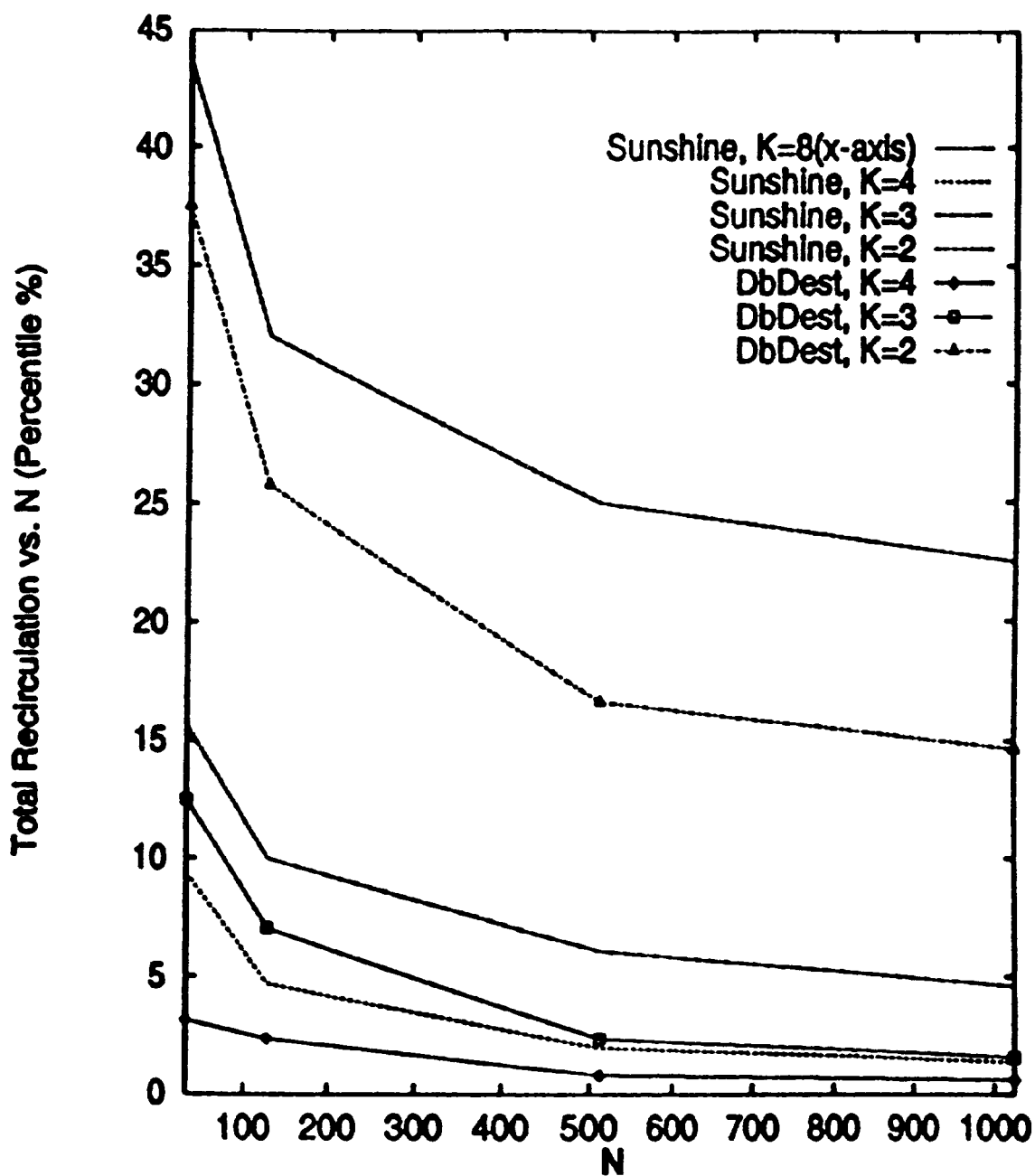
FIG. 22 depicts a plot of the total recirculation queue size required to reach a cell loss rate of less than or equal to 1e−6 for the DbDest switch unit and the SunShine switch unit under uniform traffic.

FIG. 22 is a plot showing the total recirculation queue size needed to reach a cell loss rate $\leq 10^{-6}$ as a function of various N and k values in the DbDest switch unit and SunShine switch unit under uniform traffic. In the DbDest switch unit, the total recirculation queue size equals S plus M. In the SunShine switch unit, the total recirculation queue size equals M.

For N=128 in the DbDest switch unit, with k equal to two and total recirculation buffers about 26% (percentile of N), a loss rate of $10^{-6}$ is achievable. As k increases, however, to three and total recirculation buffers decreased to 7.5%, a $10^{-6}$ loss rate is achievable, and also for k=4 and total recirculation buffers further decreased to 2.5%, a $10^{-6}$ loss rate is still achievable. From the above observation, it is apparent that the size of the front common shared recirculation buffer, M, and size of the tail individual recirculation queue, S, can be significantly reduced by increasing the number of M_banyan network in parallel (k) to shift the load of the recirculation buffers to the output ports where more cost-efficient RAM memory can be used. In the depicted example, infinite-sized output queues was assumed for the switch fabric. Moreover, output buffering was shown to achieve better performance than that of input buffering.

Another observation from FIG. 22 is that when N=32, the SunShine switch unit with k equals four, in order to reach a loss rate of $10^{-6}$, a total recirculation buffers about 9.5% is required, but under the same condition, the DbDest switch unit only requires a total recirculation buffer of 2.5%. Hence, it is quite clear that the DbDest switch unit out performs the SunShine model. Nevertheless, for small values of N, there is some distance from the goal to have half the hardware cost of the banyan networks in parallel used in the SunShine switch unit and yet have the same performance. FIG. 22 shows that for a large enough banyan network size N, the goal to half the hardware cost can be achieved. For example, for N=512 with k=3, the DbDest switch unit only requires a total recirculation buffers about 2.5%. Moreover, we can observe that the curve for k=4 in the DbDest switch unit becomes very close to the curve for k=8 in the SunShine switch unit when N≧512. Thus, DbDest switch unit has half the hardware cost of the parallel banyan networks used in the SunShine switch model and yet obtains the same performance.

As the size of the M_banyan network grows larger in the DbDest switch unit, the required total recirculation buffers to achieve $10^{-6}$ packet loss rate decreases. This becomes a very favorable factor in designing very large-scale switching networks.

B. Example

Saturated Throughput Analysis-Cell Loss Under Bursty Traffic

Figure 23:
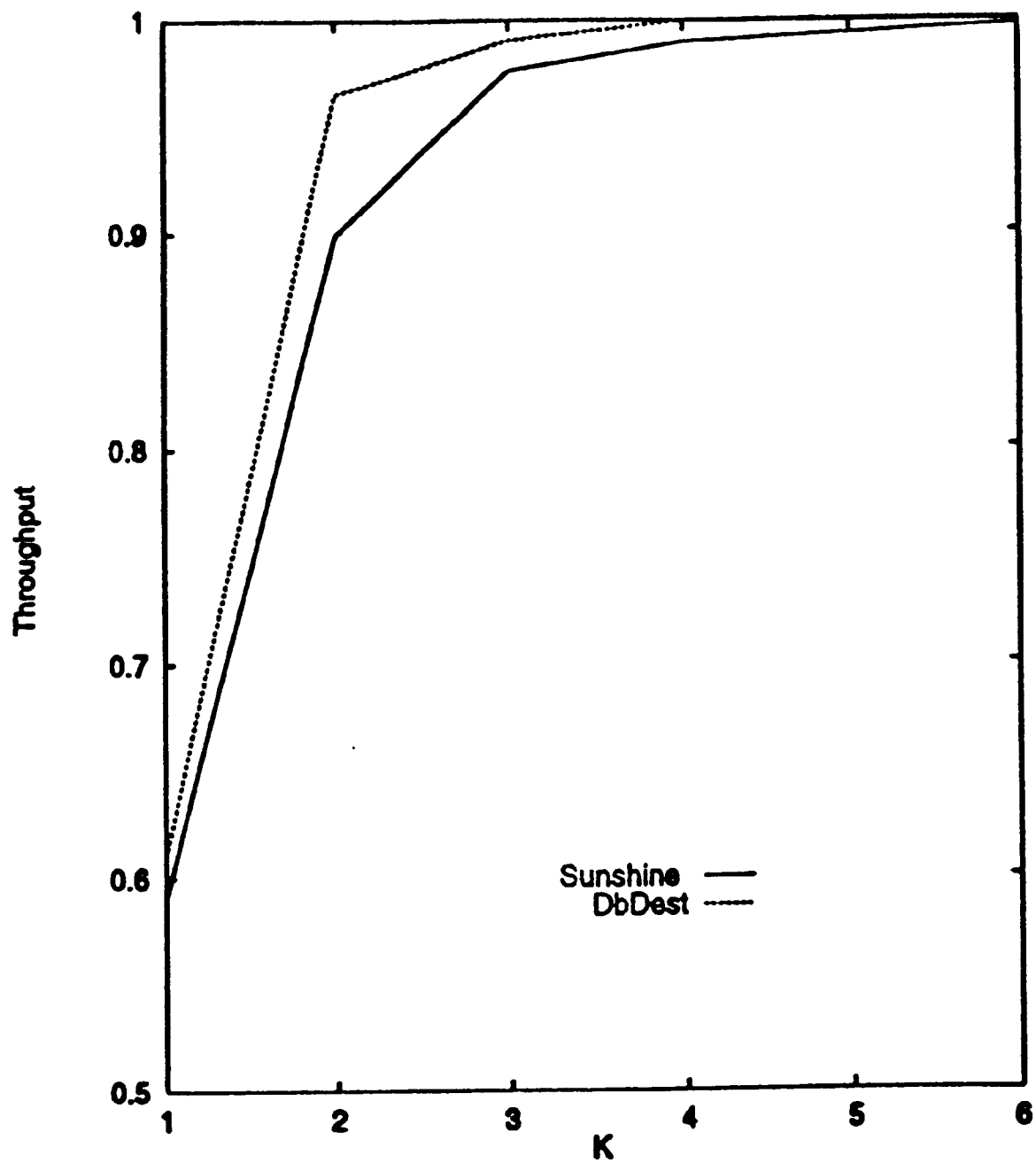
FIG. 23 is a plot for saturated throughput versus the number of banyan or modified banyan networks in parallel without employing a recirculation buffer for the SunShine switch unit and the DbDest switch unit according to the present invention.

Both SunShine switch unit and DbDest switch unit are not able to achieve high saturated throughput even by using very large recirculation buffers when only one M_banyan is used. When the number of M_banyan is greater than or equal to two, with the proper choice of the size of the recirculation buffers, it is very easy to achieve a saturated throughput of 0.99 or even higher. FIG. 23 is a plot for saturated throughput versus number of banyan (or M_banyan) networks in parallel (i.e. k) without using any recirculation buffer (front or tail) for the SunShine switch unit and the DbDest switch unit. We can observe that when k=2, the SunShine switch unit is only able to reach a throughput of 0.89, but DbDest able to reach 0.965. Moreover, when k=3, the SunShine switch unit is only able to reach a throughput of 0.97, but the DbDest switch unit able to reach higher than 0.99. It is obvious the DbDest switch outperforms the Sunshine switch unit even when no recirculation buffer is used.

In network flow control, user traffic should be monitored in order to prevent interference between users. For a connection-type service, before call set up, the user needs to provide information about the maximum burst length, peak bit rate, and average bit rate to the network manager who will make a decision to accept or reject the request. Through the whole service period, the bit rate behavior will be monitored so that users with lower bursty traffic would not be delayed by the higher bursty traffic of other users.

In the DbDest switch unit, the distribution of burst length (duration) is assumed to be the sam for all bursts arriving at any input line, and burst lengths are chosen independently by a geometric distribution; the average number of time slots between cells of a given burst is defined as the separation, which also follows another geometric distribution. It is also assumed that the output port requested by a burst is uniformly distributed over all output ports. If the separation becomes unity, then the traffic model becomes the back-to-back queue model. Furthermore, if the separation and the duration all become unity, then the traffic model is the independent uniform traffic.

Figure 24:
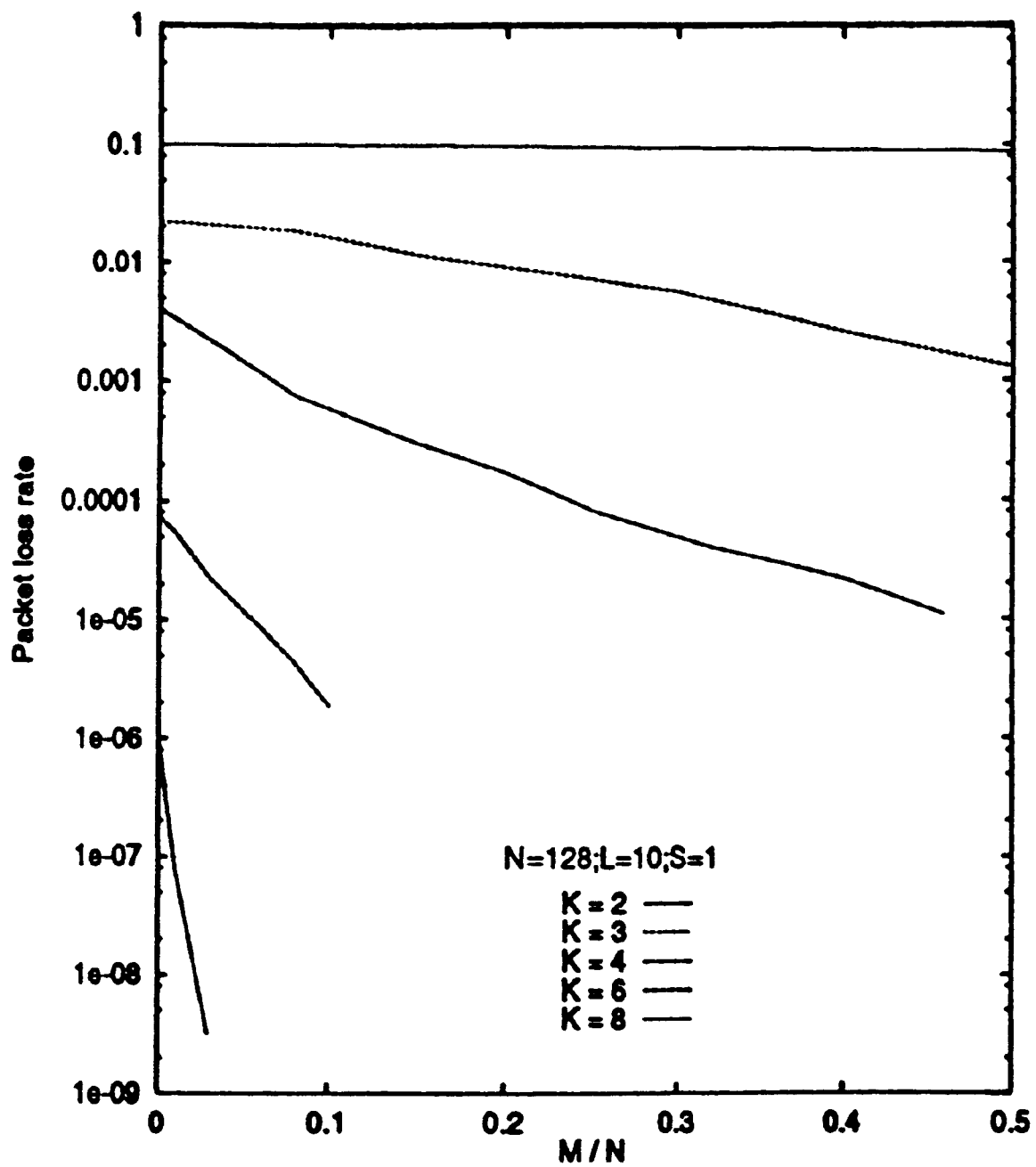
FIG. 24 depicts a plot of packet loss rates in a SunShine switch unit with various parallel banyan networks under a saturated load of bursty traffic.
Figure 25:
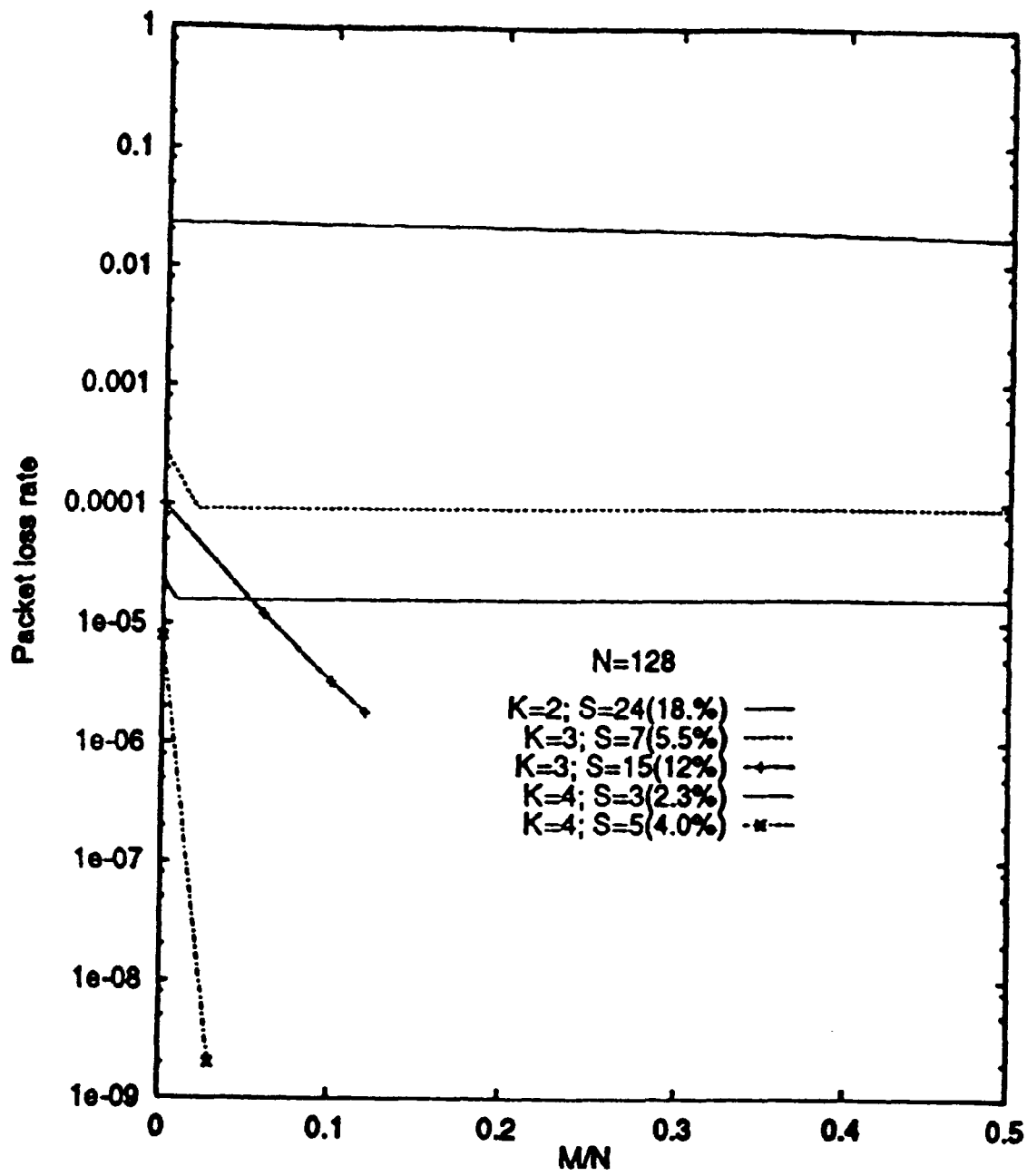
FIG. 25 is a plot of packet loss rates in a DbDest switch unit with various parallel modified banyan networks under a saturated load of bursty traffic according to the present invention.

With reference to FIG. 24, a plot of packet loss rates in a SunShine switch unit with various parallel 128×128(N=128) banyan networks as a function of M/N under saturated load of bursty traffic with mean duration equal to 10 and mean separation equal to 1 is illustrated. In FIG. 25, a plot of packet loss rates in a DbDest switch unit with various parallel 128×128(N=128) M_banyan networks as a function of M/N under a saturated load of bursty traffic with a mean duration time of 10 ATM cells and a mean separation of 1 ATM cell is illustrated according to the present invention. It is apparent that the size of the shared recirculation queue (M) is less important than the number k of the parallel banyan networks in both switches due to the possibility of mass burst cells destined to the same output port for substantially long burst lengths. Again, in the SunShine switch model, for k=4 and M/N about 0.1 the loss rate is only $10^{-3}$. In the DbDest switch unit with S equal to 4% (S=5) and k=4, the loss rate is about $10^{-9}$ with M/N at 0.023 (M=3). The SunShine switch unit can achieve the same loss rate of $10^{-9}$ only when k increases to 8 and with about the same M/N ratio. Thus, once again, the DbDest switch unit uses half the hardware cost of the parallel banyan networks used in the SunShine unit to reach the same performance as the SunShine switch even under bursty traffic patterns.

In the SunShine switch unit where only front common shared recirculation buffer is used, cells belonging to the same end-to-end connection do not become out of sequence. On the other hand, in the DbDest switch unit, which uses a tail common shared recirculation buffer in order to reduce the hardware complexity, random delays are introduced that may cause cells to become out of sequence. This sequence problem can occur only when some cell a is misrouted and recirculated through the tail recirculation buffer in some time slot t, then another cell b that belongs to the same end_to_end connection as a time is permitted to be routed in time slot t+1 along with a. If a again is misrouted and recirculated through the tail recirculation buffer, and b is successfully routed to the output port, then a will be out-of-sequence. First, the possibility of cells becoming out of sequence when uniform traffic is applied is analyzed. For a network with N=128, if only one M_banyan is used (k=1), the change of becoming out-of-sequence for consecutive cells for the same end-to-end connection is only about one in twenty-five thousand. With two, three or four M_banyans, no cells become out-of-sequence according to the simulations. Note that since the DbDest switch unit with only one M_banyan network achieves a saturated throughput of about 0.6, it is not a desirable choice unless hardware cost is extremely limited. Nevertheless, a remedy for this case is present, as described below.

The possibility of cells becoming out of sequence when bursty traffic is applied was analyzed. Under bursty traffic, if the rate of incoming cells belonging to the same end_to_end connection satisfies the peak rate and average rate limits for a line, and the Separation for consecutive cells arriving during a burst is large enough, then the possibility for cells getting out of sequence is as low as that in the uniform traffic case. Simulations were ran for back-to-back (i.e., worst case) bursty traffic in a network of size N=128 and found that the probability for cells becoming out of sequence when one M_banyan network is used increases many times over the probability in the uniform traffic case, but becomes only one in one hundred thousand when two M_banyan networks are used. For three or four M_banyan networks, no cells become out of sequence.

Two methods may be employed to overcome possible out-of-sequence problem in the DbDest switch unit in accordance with a preferred embodiment of the present invention. One way is to add a recirculation-marked bit to the cell header, such that during the routing in an M_banyan network, whenever output conflict occurs in a switch element, a cell with a set recirculation-marked bit will be correctly routed. The simulation shows that this approach is able to reduce the out of sequence probability by half. Trouble will occur when two recirculated cells meet each other and fight for the same output in a switching element. In order to handle the above situation, a second method is adopted where a resequencing buffer of a very small size at each output buffer is used. The required size of the resequencing buffer in order to achieve a small loss rate is only about 4k (where k is the number of M_banyans in parallel) since our simulations indicate that if cells c and d are out-of-sequence, then c and d are always adjacent to each other, and at most 2k cells will successfully reach the output buffers in one time slot.

C. Example

Link Grouping

For the link grouping in the DbDest switch unit, each link group was set to have equal size. In the computer simulation, instead of counting the cell loss rate, the loss rate of datagrams which consist of several cells was counted. The loss of even one cell implied the loss of the whole datagram. Only a bimodal distribution of datagrams is used here, single-cell datagrams and multiple-cell datagrams, which consist of 100 cells. The traffic profile was assumed to have 80% single-cell datagram arrivals and 20% 100-cell datagram arrivals.

Figure 26:
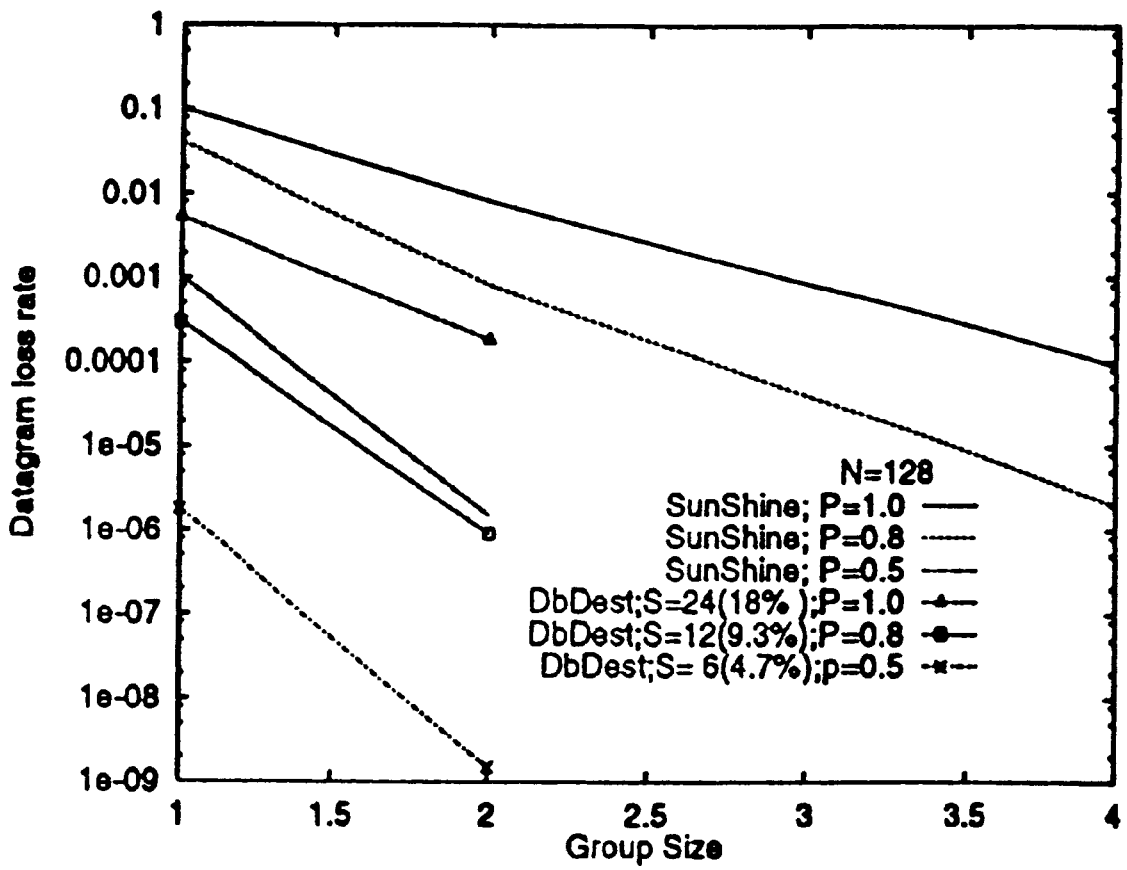
FIG. 26 is a plot illustrating the loss probability of datagrams as a function of link group size for various offerloads for both the DbDest switch unit and the SunShine switch unit according to the present invention.

FIG. 26 shows that loss probability of datagrams as a function of link group size for various offerload p for both the DbDest switch unit and the SunShine switch unit with the separation (the interarrival time between cells in a datagram) of three cell time slots. The SunShine switch unit has two parallel 128×128(N=128) banyan networks while the DbDest switch unit has two parallel 128×128(N=128) M_banyan networks. From FIG. 26, it is apparent that although both the DbDest switch and the SunShine switch unit use the same number of M_banyan networks in parallel (i.e. k=2), the DbDest switch unit only uses half of the group size that required in the SunShine switch unit to reach about the same loss rate. For example, when offerload p=1, the DbDest switch unit only needs a group size of two to achieve loss rate of $10^{-4}$, but the SunShine switch unit needs a group size of four; when offerload p=0.5, DbDest only needs a group size of one to achieve loss rate of $10^{-6}$, but the SunShine model needs a group size of two. In other words, the DbDest switch unit has twice the number of available logic links than that of the SunShine switch unit. Consequently, the DbDest switch unit can achieve higher bandwidth utilization, and provide more high bit-rate services over the SunShine switch unit.

A special case of the multilink access algorithm occurs when the link group sizes all become unity. In this case, the real offsets become meaningless and the temporary offsets are used to find the "winner" cells. Moreover, the group ID request becomes the same address as the physical output request address, so that only step 0 to step 3 are required. In order to identify the first occurrence of each output destination request, each output port for the batcher sorter needs a $log_2N$-bit magnitude comparator. The comparator has a hardware complexity of at least $O(log_2N)$ if we assume that a one-bit comparator has the same hardware cost as a 2×2 switching element. Then, the total hardware complexity of comparators for a batcher sorter with N outputs becomes $O(Nlog_2N)$. Moreover, a broadcast bus and a $log_{2N}$-bit subtractor are required to compute the temporary offsets. Hence, the overall complexity of the needed hardware to execute is $O(Nlog_2N)$. This special case multilink access can be applied to the hardware design for trap network.

Thus, the present invention provides an improved switch in which banyan networks are modified to include a distinguisher, a dual bus (2 single-hop buses), and multiplexers, which result in requiring a smaller number of switches than presently available switching systems. This architecture allows for double destination switching as described above. Consequently, cost and weight are reduced for switches designed according to the present invention. Additionally, the present invention provides an architecture to tolerate single and multiple faults in an economical manner. In addition, the technology employed consumes very little power compared to TTL or ECL-based switches and is scalable to handle varying amounts of traffic within a communications system. In particular, the present invention provides a switch that has about half the cost of combarable existing switches that employ banyan networks. Thus, the switches of the present invention are particularly suited for implementation on board satellites as well as on the ground. The present invention also provides the ability to implement both switches for small and very large systems with equal ease by employing high performance BiCMOS or CMOS VLSI implementation and by employing a three dimensional packaging structure to achieve the speeds of 150 MBPS or 600 MBPS.

The switch architecture is based on batcher-banyan networks in which several parallel modified banyan networks are included along with a front common shared recirculation buffer, a tail individual recirculation buffer for each modified banyan network, an output queue in every output port. Output overloads under bursty traffic can be effectively handled by the parallel modified banyan networks and the output queues. In addition, the modified banyan network i accommodates two cells per destination through the use of a dual bus architecture attached to the end of the modified banyan network.

Thus, it has been shown that the switch of the present invention can accomplish the same or better performance than existing switch architectures with only about half the cost of the parallel banyan networks. Additionally, even for large values of N, the cell loss rate is less than 1e–6 and small end-to-end cell delays with even smaller hardware cost ratios are present. In large aggregates of traffic environment, link grouping may be employed to form high band with pipes. The link grouping technique with the efficient multilink access algorithm reduces cell loss and increases throughput, especially under heavy bursty traffic. Finally, the redundant switch components allows the M_banyan networks to recover from single or multiple failures. Thus, the switch of the present invention provides a solution for high speed packet switching to support needs up to 150 MBPS or 600 MBPS, which are required under BISDN networks that employ ATM.

The description of the preferred embodiment of the present invention has been presented for purposes of illustration and description, but is not intended to be exhaustive or limit the invention in the form disclosed. For example, although ATM cells are routed in the depicted examples, other types of data packets also may be routed according to the present invention. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. An apparatus for routing data packets comprising:

a plurality of inputs, wherein a plurality of data packets are received at the plurality of inputs, each data packet within the plurality of data packets including routing information;

a plurality of outputs, wherein the plurality of outputs are associated with a plurality of destinations such that each output within the plurality of outputs corresponds to a destination within the plurality of destinations;

routing means for routing the plurality of data packets received by the plurality of inputs through the apparatus to the plurality of outputs using the routing information, wherein said routing means includes a TRAP network modified to include an arbitration unit for determining priority among a plurality of data packets routed to the same output port simultaneously, and a double destination switch and further wherein a number of data packets within the plurality of data packets are misrouted by the double destination switch of said routing means; and a bus means for routing a data packet to a destination, wherein the bus means is connected to the routing means and wherein the data packet is a data packet, within the number of data packets, misrouted from the destination associated with the data packet by a selected amount, and further wherein said bus means routes the data packet to its correct destination.

2. The apparatus of claim 1, wherein the number of data packets within the plurality of data packets misrouted by the routing means are misrouted data packets and further comprising:

sorting means, responsive to the plurality of data packets being received at the plurality of inputs, for sorting the plurality of data packets using the routing information in each data packet within the plurality of data packets; and a buffer means having a first connection connected to the routing means and a second connection connected to the sorting means, wherein the misrouted data packets are sent to the buffer by the routing means, stored in the buffer, and sent to the sorting means after a period of time.

3. The apparatus of claim 1, wherein the routing means includes:

selection means, responsive to a number of the plurality of data packets being routed to a destination within the plurality of destinations, for selecting a first portion of the plurality of data packets for routing through the apparatus to the destination and for selecting a second portion of the plurality of sorted data packets for recirculation with another plurality of data packets arriving at the plurality of inputs.

4. The apparatus of claim 3, wherein said selection means includes:

a number of arbitration units within an output contest network (TRAP network), said arbitration units having:
a counter;
an arbitration circuit;
an AND gate;
means for resolving contention caused by too many input ports requesting a common output port simultaneously, said arbitration unit further comprising means for assigning a routing characteristic to each cell, said characteristic being utilized to determine when said cell is to be routed to a destination, recirculated or discarded; and a concentrator network having means for separating a cell to be routed to the output port from a cell to be either recirculated or discarded, said means including a smart routing algorithm which routes cells based on a priority setting in a routing bit or bits located in a header of the cell.

5. The apparatus of claim 1 further comprising redundancy means, responsive to a failure of a portion of the routing means, for dynamically allowing the routing means to continue to route the plurality of data packets.

6. The apparatus of claim 5, wherein the routing means includes a plurality of switching elements for routing the plurality of data packets and wherein the redundancy means includes a number of redundant switching elements, a portion of the redundant switching elements being used to route the plurality of data packets in response to a failure of a portion of the switching elements in the routing means.

7. The apparatus of claim 5, wherein the routing means includes a plurality of switching elements for routing the plurality of data packets, the switching elements being connected to each other by links, wherein the redundancy means includes spare links connecting the plurality of switching elements, a portion of the spare links being used to route the plurality of data packets within the plurality of switching elements in response to a failure of a portion of the plurality of switching elements.

8. The apparatus of claim 7, wherein said redundancy means further comprise a plurality of dual switching elements with a primary element handling routing of cells, and a secondary element operating as a backup to said primary element, wherein said secondary element dynamically activates upon failure of said primary element, wherein further said dual switch element is linked to a second dual switch element, said linked being utilized as follows:

when said primary element and said secondary element of said dual switch element both fail, said second dual switch element is utilized to route the cells previously routed by dual switch element; and when said dual switch element has no free resources to process additional cells being routed to it, said cells are dynamically routed to said second dual switch elements.

9. The apparatus of claim 1 further comprising linking means for linking a portion of the plurality of outputs to form a linked output, wherein the linked output is associated with a destination within the plurality of destinations and includes at least two outputs from the plurality of outputs.

10. The apparatus of claim 9, wherein said group linking means includes linking a plurality of consecutive output ports to form said link group, said link group having an associated group size, wherein a link group is identified by its smallest physical output port number, and each address within said group contains a link group number as a routing number, wherein further each cell being routed to said link group is give a bit in a header of said cell indicating said link group number; and said cells within a link group are sorted and assigned a real offset address calculated from said smallest physical output port number and its location with respect to the other cells, wherein a cell is routed within the link group when its real offset address is smaller than the link group size, and a cell is discarded or recirculated otherwise.

11. The apparatus of claim 10, wherein said link group comprises of a single port address and further said link group address is the physical output port address and has a real offset address of zero.

12. The apparatus of claim 1, wherein the selected amount is an output adjacent to the output associated with the destination of the misrouted cell.

13. A method for routing a plurality of cells in a switching system having a plurality of inputs and a plurality of outputs, the method comprising:

receiving the plurality of cells at the plurality of inputs, wherein each cell within the plurality of cells includes a destination such that the plurality of cells have a plurality of destinations and each destination within the plurality of destinations is associated with an output within the plurality of outputs;

routing each cell within the plurality of cells through a plurality of switching elements within the switching system towards the plurality of outputs using the plurality of destinations, said switching elements including a TRAP network modified to include an arbitration unit for determining priority among a plurality of data packets routed to the same output port simultaneously, and a double destination switch, and wherein a portion of cells within the plurality of cells are correctly routed through the plurality of switching elements to the plurality of outputs and wherein another portion of the cells within the plurality of cells are misrouted, forming a plurality of misrouted cells;

identifying cells as bus routable cells within the plurality of misrouted cells, wherein the bus routable cells are cells misrouted from the correct outputs by a selected amount and routing an identified cell to an output associated with the destination for the cell using a bus connected to the plurality of switching elements to route the misrouted cells to the correct outputs.

14. A switch unit comprising:

a plurality of input port controllers having a plurality of inputs and outputs, wherein a plurality of cells are received at the plurality of inputs, each input port controller within the plurality of input port controllers, responsive to receiving a cell within the plurality of cells at an input within the plurality of inputs associated with the input port controller, attaching a header to the cell, the header containing routing information including a destination for the cell;

a batcher sorting network having a plurality of inputs connected to the outputs of the plurality of input port controllers and a plurality of outputs, wherein the batcher sorting network sorts the cells using the routing information within the header attached to each cell within the plurality of cells, generating a plurality of sorted cells;

an output contest network having a plurality of inputs connected to the plurality of outputs of the batcher sorting network for receiving the plurality of sorted cells and a plurality of outputs, wherein the output contest network contains a TRAP network modified to include a plurality of arbitration units which resolves contention for destinations and in response to a number of cells being routed to the same destination, marking a first portion of the number of cells for routing to the destination and a second portion of the number of cells for recirculation forming a plurality of marked cells;

a concentrator network having an input for receiving the plurality of marked cells and a first output connected to the batcher sorting network and a second output, wherein the concentrator network sends the first portion of cells to the second output and recirculates the second portion of cells to the batcher sorting network through the first output; and a plurality of switching networks, each switching network having a plurality of inputs connected to the second output of the concentrator network, each switching network including:

a single path switching matrix connected to the plurality of inputs and having a plurality of outputs;

a dual bus having a plurality of inputs connected to the plurality of outputs in the single path switching matrix and having a plurality of outputs;

wherein the first portion of the plurality of cells are received from the output of the concentrator network and routed through the single path switching network to the plurality of outputs, and wherein cells correctly routed through the single path switching network are sent to the plurality of outputs and cells misrouted through the single path switching network to an output adjacent to a correct output are routed through the dual bus to the correct output; and a plurality of output port controllers, each output port controller having an input connected to an output from the plurality of outputs from each switching network within the plurality of switching networks.

15. The switch unit of claim 14 further comprising a buffer, wherein the first output of the concentrator network is connected to the batcher sorting network through the buffer and the second portion of the plurality of sorted cells are stored within the buffer for a period of time before being sent to the batcher sorting network.

16. The switch unit of claim 15, wherein the period of time is selected to coincide with a time slot in which another plurality of cells arrive at the plurality of inputs such that the second portion of the plurality of sorted cells are sent to the batcher sorting network as another plurality of cells arrive at the plurality of input port controllers.

17. The switch unit of claim 14 further comprising a buffer having an input and an output, wherein the input is connected to the plurality of networks and the output is connected to the batcher sorting network and wherein the buffer receives misrouted cells from the plurality of networks and stores the misrouted cells for a period of time before sending the misrouted cells to the batcher sorting network.

18. The switch unit of claim 17, wherein the period of time is selected to coincide with the time slot in which another plurality of cells arrive at the plurality of inputs such that the second portion of the plurality of sorted cells are sent to the batcher sorting network as another plurality of cells arrives at the plurality of input port controllers.

19. The switch unit of claim 14 further comprising linking means for linking the plurality of outputs into a plurality of linked outputs, wherein each linked output within the plurality of linked outputs includes at least one output, wherein a cell having a destination that is associated with a linked output having at least two outputs is routed to at least one of the two outputs, wherein a capacity for a number of cells that arc routed to a destination is increased.

20. The switch unit of claim 19, wherein the linking means includes a control means, responsive to receiving a cell at an input having an identification associated with a linked output, for identifying outputs within the plurality of outputs constituting the linked output and routing the cell to the identified outputs.

21. The switch unit of claim 14, wherein the single path switching matrix includes a plurality of switching elements connected to each other by a plurality of links, wherein cells are sent between switching elements using the plurality of links, wherein each of the plurality of switching networks includes a plurality of spare switching elements in which at least a portion of the plurality of spare switch elements are activated in response to a failure of a switching element within the single path switching matrix.

22. The switch unit of claim 21, wherein each single path switching matrix includes a plurality of spare links connecting the plurality of switching elements, a portion of the spare links being used to route the plurality of cells between the plurality of switching elements in response to a failure of a portion of the plurality of switching elements.

23. The switch unit of claim 14, wherein the plurality of switching networks is tour switching networks.

24. The switch unit of claim 14, wherein each of the output port controllers includes a multiplexer connected to the plurality of switching networks and a buffer, wherein cells are stored in the buffer until transferred from the switch.

25. An apparatus for routing cells comprising:
a plurality of inputs;
a batcher sorting network connected to the plurality of inputs and having an output;
an output contest network having an input connected to the output of the batcher sorting network and having an output, said output contest network consisting of a TRAP network modified to include a plurality of arbitration units;
a plurality of switching networks connected to the output of the output contest network, each switching network within the plurality of switching networks including:
a plurality of inputs;
a single path switching matrix connected to the input, wherein cells are received from the output of the batcher sorting network;
a double destination switch;
a bus system; and
a plurality of outputs connected to the bus system.

26. The switch of claim 25, wherein the output of the output contest network is connected to the plurality of switching networks by a concentrator having an input connected to the output contest network and an output connected to the plurality of switching networks.

27. The apparatus of claim 26, wherein the bus system is connected to the plurality of outputs by a plurality of output port controllers, said output port controllers including a multiplexor and a buffer.

28. A communication system comprising:
a plurality of switches, wherein at least one of the plurality of switches includes:
a plurality of inputs;
a batcher sorting network connected to the plurality of inputs and having an output;
an output contest network having an input connected to the output of the batcher sorting network, said output contest network having an output and further comprising a modified TRAP network having a number of sub-elements including:
a plurality of arbitration units; and
a plurality of NOR gates and demultiplexers connected to said arbitration units;
a plurality of switching networks connected to the output of the output contest network, each switching network within the plurality of switching networks including:
a plurality of inputs;
a single path switching matrix connected to the input, wherein cells are received from the output of the batcher sorting network;
a double destination switch;
a dual bus system;
a plurality of outputs connected to the dual bus system;
a plurality of redundant elements utilized for dynamic failure correction;
a plurality of group links, wherein each group link represents a finite group of output port addresses;
a plurality of communications links, wherein the plurality of switches are connected to each other by the plurality of communications links and wherein data is transferred between the plurality of switches through the plurality of communications links; and
a plurality of data processing systems located within different portions of the communication system, wherein data is sent from a first data processing system within the plurality of data processing systems to a second data processing system within the plurality of data processing systems using a portion of the plurality of switches and a portion of the plurality of communications links.

29. The communication system of claim 28, wherein at least one of the plurality of switches is a satellite switch and at least one of the plurality of switches is a terrestrial switch.

* * * * *

UNITED STATES PATENT AND TRADEMARK OFFICE
CERTIFICATE OF CORRECTION

PATENT NO.   : 6,026,092
DATED        : February 15, 2000
INVENTOR(S)  : Abu-Amara, et. al.

It is certified that error appears in the above-indentified patent and that said Letters Patent is hereby corrected as shown below:

Column 26, Claim 23, line 2, change "tour" to --four--

Signed and Sealed this

Twentieth Day of March, 2001

Attest:

NICHOLAS P. GODICI

*Attesting Officer*    *Acting Director of the United States Patent and Trademark Office*